3,794,645
1-(m-HALO-p-AMINO-PHENYL)-4-AMINO-TERT.BUTANOLS-(1) AND SALTS THEREOF

Helmut Pieper and Gerd Kruger, Biberach an der Riss, Klaus-Reinhold Noll, Warthausen-Obernhofen, and Johannes Keck and Joachim Kahling, Biberach an der Riss, Germany, assignors to Boehringer Ingelheim G.m.b.H., Ingelheim am Rhein, Germany
No Drawing. Filed Oct. 12, 1970, Ser. No. 80,226
Claims priority, application Germany, Oct. 13, 1969, P 19 51 614.4; Aug. 8, 1970, P 20 42 749.0; Aug. 28, 1970, P 20 42 750.3
Int. Cl. C07c 91/40; C07d 29/28, 41/04
U.S. Cl. 260—239 B                  9 Claims

ABSTRACT OF THE DISCLOSURE

Compounds of the formula

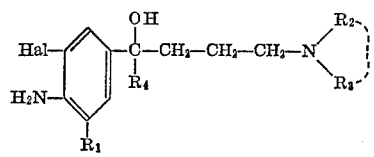

wherein
Hal is chlorine or bromine,
$R_1$ is hydrogen, chlorine or bromine,
$R_2$ is hydrogen, alkyl, alkenyl, dialkylamino-alkyl, cycloalkyl, phenyl, aralkyl or adamantyl,
$R_3$ is alkyl, alkenyl, dialkylamino-alkyl, cycloalkyl, phenyl, arakyl or adamantyl,
$R_2$ and $R_3$, together with each other and the nitrogen atom to which they are attached, are pyrrolidino, piperidino, piperazino, morpholino, hexamethyleneimino or camphidino, where each of these may optionally have one or more hydroxy, alkoxy, phenyl or lower alkyl substituents attached thereto, and
$R_4$ is alkyl, cycloalkyl, cycloalkenyl, norbornyl, phenyl, aralkyl, naphthyl, pyridyl or thienyl, where said cycloalkyl may optionay have one or more hydroxyl, alkyl, alkoxy, alkylthio, trifluoromethyl, phenyl or phenoxy substituents attached thereto, and said phenyl may optionally have one or more fluoro, chloro or bromo substituents attached thereto,
and their non-toxic, pharmocologically acceptable acid addition salts; the compounds as well as the salts are useful as sedatives, anti-emetics, stomach ulcler-inhibitors and CNS-stimulants in warm-blooded animals.

---

This invention relates to novel 1-(m-halo-p-aminophenyl)-4-amino-tert.butanols-(1) and non-toxic acid addition salts thereof, as well as to various methods of preparing these compounds.

More particularly, the present invention relates to compounds of the formula

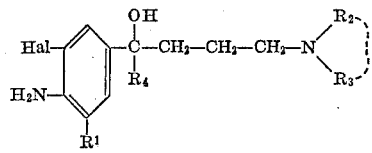

wherein Hal is chlorine or bromine,
$R_1$ is hydrogen, chlorine or bromine,
$R_2$ is hydrogen, alkyl, alkenyl, dialkylamino-alkyl, cycloalkyl, phenyl, aralkyl or adamantyl,
$R_3$ is alkyl, alkenyl, dialkylamino-alkyl, cycloalkyl, phenyl, arakyl or adamantyl, $R_2$ and $R_3$, together with each other and the nitrogen atom to which they are attached, are pyrrolidino, piperidino, piperazino, morpholino, hexamethylene-imino or camphidino, where each of these may optionally have one or more hydroxy, alkoxy, phenyl or lower alkyl substituents attached thereto, and
$R_4$ is alkyl, cycloalkyl, cycloalkenyl, norbornyl, phenyl, aralkyl, naphthyl, pyridyl or thienyl, where said cycloalkyl may optionally have one or more hydroxyl, alkyl, alkoxy, alkylthio, trifluoromethyl, phenyl or phenoxy substituents attached thereto, and said phenyl may optionally have one or more fluoro, chloro or bromo substituents attached thereto, and non-toxic, pharmacologically acceptable acid addition salts thereof.

The compounds of the instant invention may be prepared by the following methods:

METHOD A (a) By reacting a compound of the formula

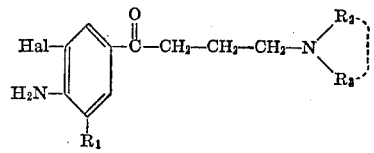

wherein $R_1$, $R_2$, $R_3$ and Hal have the same meanings as in Formula I, with a metal organic compound of the formula $$R_4—X \quad (III)$$

wherein $R_4$ has the same meanings as in Formula I, and X is a metal of the 1st or 2nd group of the periodic system or a halide of the latter, preferably lithium or a magnesium-halide.

The reaction is performed in an inert organic solvent, such as ether, tetrahydrofuran or a mixture of these, advantageously at temperatures between −70° and 65° C., and, if necessary, in an atmosphere of an inert gas. It is of advantage to use for the reaction an excess of a metal organic compound of the Formula III, for example, a 2- to 10-fold excess over the stoichiometrically required amount.

For the production of a compound of Formula I wherein the radical $R_4$ comprises one or several hydroxyl groups, a compound of the Formula III is used, wherein the hydroxyl groups are protected by easily removable protective groups, such as trimethylsilyl, triphenylmethyl or tetrahydropyranyl. These are split off after the reaction by means of conventional methods, for instance, by hydrolysis.

For the reaction it may be of advantage to protect groups with active hydrogen atoms, such as hydroxyl or amino groups, in compounds of the Formula II by an easily removable group, for example, by the trimethylsilyl, triphenylmethyl or tetrahydroxypyranyl group. Subsequently the protective group is removed, if desired, by means of conventional methods, for instance, by hydrolysis. However, the reaction may also be carried out without introduction of a protective group.

METHOD B

By reacting a ketone of the formula

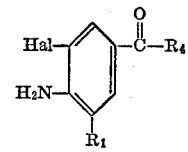

wherein $R_1$, $R_4$ and Hal have the same meanings as in Formula I, with a metal organic compound of the formula

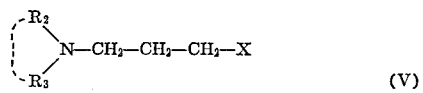
(V)

wherein $R_2$, $R_3$ have the same meanings as in Formula I and X has the same meanings as in Formula III.

The reaction is carried out in an inert organic solvent, such as ether, tetrahydrofuran or a mixture of these, advantageously at temperatures between —70° and 65° C., and, if necessary, in an atmosphere of an inert gas. It is of advantage to use an excess of a metal organic compound of the Formula V, for instance, a 2- to 5-fold excess over the stoichiometrically required amount.

For the production of a compound of the Formula I, wherein the radicals $R_2$ or $R_3$ are hydrogen or comprise groups with active hydrogen atoms, such as hydroxyl or amino groups, a compound of the Formula V is used, wherein these hydrogen atoms are replaced by easily removable protective groups, such as trimethylsilyl, triphenylmethyl or tetrahydropyranyl. After the reaction, the protective groups are split off by means of conventional methods, for instance, by hydrolysis.

For the reaction it may be of advantage to protect groups with active hydrogen atoms in compounds of the Formula IV, for instance, hydroxyl or amino groups, with an easily removable group, for instance, with trimethylsilyl, triphenylmethyl or tetrahydropyranyl. Subsequently, the protective group is removed, if desired, by means of conventional methods, for instance, by hydrolysis. The reaction may, however, be carried out without previous introduction of a protective group.

METHOD C

For the production of compounds of the Formula I, wherein $R_2$ and $R_3$ have the same meanings as in Formula I with the exception of alkenyl, and $R_4$ has the same meanings as in Formula I with the exception of cycloalkenyl, by halogenation of a compound of the formula

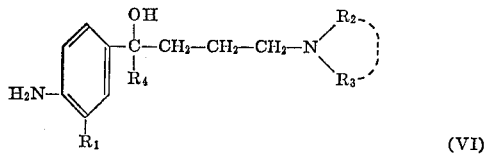
(VI)

wherein $R_1$, $R_2$ and $R_3$ have the same meanings as in Formula I with the exception of alkenyl and $R_4$ has the same meanings as in Formula I with the exception of cycloalkenyl.

The halogenation is carried out with a halogenating agent, for instance, the chlorination by means of chlorine, sulfuryl chloride or phenyl iodide chloride, and the bromination by means of bromine, bromine iodide or pyridinium perbromide, preferably in a solvent such as 50–100% acetic acid, methylene chloride, chloroform, carbon tetrachloride, carbon disulfide, ether or dioxane, preferably at temperatures between 0° and 50° C.

One or two mols of the halogenating agent, or a slight excess thereover, are provided per mol of a compound of the Formula VI which may be used as the free base or as a salt, such as the mono-, di- or trihydrochloride. The hydrohalic acid addition salt of the halogenated compound formed by the reaction may be isolated as such from the reaction mixture; however, the salt may also be converted in situ into the free base by conventional methods.

METHOD D

By de-acylation of a compound of the formula

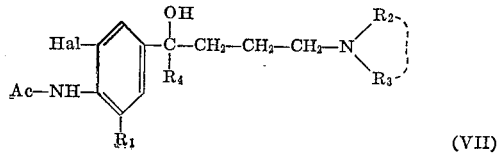
(VII)

wherein Hal, $R_1$, $R_2$, $R_3$ and $R_4$ have the same meanings as in Formula I and Ac is any desired acyl group, such as acetyl.

The removal of the acyl group is preferably performed by means of alkaline hydrolysis, for instance in the presence of an alkali metal hydroxide, such as sodium hydroxide, in an appropriate solvent, such as water or methanol, and at temperatures up to the boiling point of the particular solvent which is used.

METHOD E

For the production of compounds of the Formula I wherein $R_2$ and $R_3$, together with the nitrogen atom, form an acyclic amino radical, by alkylation of a compound of the formula

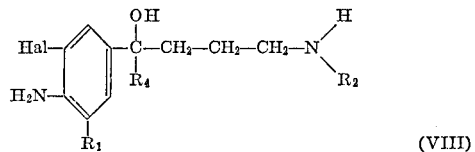
(VIII)

wherein Hal, $R_1$, $R_2$ have the same meanings as in Formula I with the exception of hydrogen, and $R_4$ has the same meanings as in Formula I with the exception of pyridyl, with a compound of the formula

$$R_3—Y \quad (IX)$$

wherein $R_3$ has the same meanings as in Formula I, and Y is chlorine, bromine or iodine.

The reaction is preferably carried out in the presence of an inorganic base, such as an alkali metal hydroxide, alkali metal carbonate or alkali metal hydride, or an orgnic tertiary base, such as triethylamine, or in the presence of a metal organic compound, such as lithium naphthyl, in an inert organic solvent, such as ethanol, benzene or tetrahydrofuran, and at temperatures up to the boiling point of the particular solvent which is used.

The compounds of the Formula I thus obtained may be converted into their non-toxic, pharmaceutically acceptable acid addition salts with inorganic or organic acids. Examples of such acid addition salts are those formed with hydrochloric acid, hydrobromic acid, sulfuric acid, p-toluenesulfonic acid, phosphoric acid, lactic acid, citric acid, tartaric acid, maleic acid, oxalic acid, 8-chlorotheophylline or the like.

The starting compounds of the Formula II are obtained pursuant to processes known from the literature, for instance, by reaction of the correspondingly substituted haloalkyl-ketones with amines; some of them are described in Belgian Pat. No. 729,473.

The starting compounds of the Formula IV are prepared, for example, by reaction of 4-acetamidobenzaldehyde with a corresponding Grignard reagent to form the corresponding carbinol, subsequent oxidation of this carbinol to the analogous actamido-ketone, saponification of the acetamino group into the amino group and subsequent halogenation, or halogenation of the acetamido-ketone and subsequent saponification. If initially a monohalo compound has been produced, a further identical or different halogen atom may be introduced into the same by conventional methods.

The starting compounds of the Formula V are obtained according to processes known from the literature, for instance, by reacting a correspondingly substituted amine with a dihalo-propane, preferably with bromo-chloro-propane.

The starting compounds of the Formula VI, for example, are obtained by a Grignard reaction of the corresponding butyrophenones or of the corresponding ketones of the formula

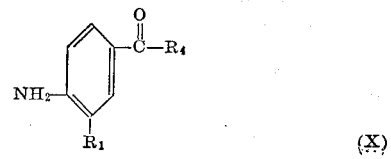
(X)

wherein $R_1$ and $R_4$ have the same meanings as in Formula I.

The compounds of the Formula VII are obtained, for example, by Grignard reaction from the corresponding butyrophenones or from the corresponding ketones of the formula

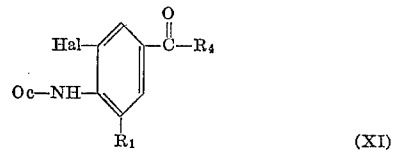

(XI)

wherein $R_1$, $R_4$ and Hal have the same meanings as in Formula I and Ac has the same meanings as in Formula VII.

The compounds of the Formula VIII are preferably produced by method B above.

The following examples further illustrate the present invention and will enable others skilled in the art to understand it more completely. It should be understood, however, that the invention is not limited solely to the particular examples given below.

EXAMPLE 1

4 - amino - 3,5 - dibromo - α - phenyl-α-(3′-piperidino-n-propyl)-benzyl alcohol by method A.—A solution of 211 gm. of freshly distilled bromobenzene in 500 ml. of absolute tetrahydrofuran was added dropwise to a stirred mixture of 32.7 gm. of magnesium and 100 ml. of absolute tetrahydrofuran, the rate of dropwise addition being such that the bromobenzene was suppled as fast as it would react. After all of the bromobenzene solution had been added, the reaction mixture was refluxed for 30 minutes and then cooled to room temperature. Thereafter, while stirring the cold reaction mixture, a solution of 54 gm. of 4′ - amino - 3′,5′-dibromo-4-piperidino-butyrophenone in 500 ml. of absolute tetrahydrofuran was added dropwise thereto, and then the resulting mixture was refluxed for two hours, cooled and poured into a mixture of aqueous ammonium chloride and ice. The organic phase was separated, and the aqueous phase was extracted twice with ether. The organic phase was combined with the ether extract solution, and the mixture was dried with sodium sulfate and evaporated in vacuo. The solid brown residue was recrystallized first from a mixture of cyclohexane and absolute ethanol (1:1) and then from absolute ethanol, yielding the compound of the formula

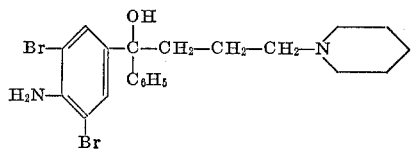

having a melting point of 183–185° C.

EXAMPLE 2

4 - amino - α - cyclohexyl - 3,5 - dibromo-α-(3′-piperidino - n - propyl)-benzyl alcoohl by method A.—A solution of 800 gm. of 3 - piperidino - n - propyl chloride in 800 ml. of absolute tetrahydrofuran was added dropwise to a stirred mixture of 124 gm. of magnesium and 200 ml. of absolute tetrahydrofuran, the rate of dropwise addition being such that the piperidino-propyl chloride was provided as rapidly as it would react. After all of the piperidino-propyl chloride solution had been added, the reaction solution was stirred for 30 minutes at 60–70° C. and then cooled to room temperature. Thereafter, while stirring the cold solution and cooling it exteriorly with water, a solution of 355 gm. of (4-amino-3,5-dibromophenyl) - cyclohexyl - ketone in 1.5 liters of absolute tetrahydrofuran was rapidly added dropwise thereto. Then, the resulting mixture was stirred for one hour at room temperature and subsequently poured into a mixture of aqueous ammonium chloride and ice. The organic phase was separated, and the aqueous phase was extracted twice with ether. The organic phase and the ether extract solution were combined, dried with sodium sulfate and evaporated in vacuo. The residue was triturated with one liter of a mixture of ethanol and petroleum ether (1:1), and the crystalline product was collected by vacuum filtration and recrystallized twice from absolute ethanol, yielding the compound of the formula

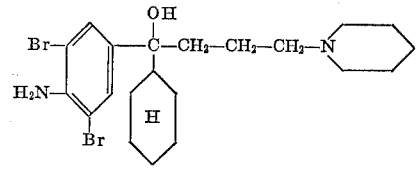

having a melting point of 212–124° C.

Its hydrochloride had a melting point of 139–141° C. (decomp.).

Its p-toluenesulfonate had a melting point of 127.5–129.5° C. (decomp.).

EXAMPLE 3

4 - amino - α - cyclohexyl - 3,5-dibromo-α-(3′-n-propyl-amino-n-propyl)-benzyl alcohol by method A.—A solution of 60 gm. of 3 - (N - trimethylsilyl-n-propylamino) - 1 - chloro - propane in 150 ml. of absolute tetrahydrofuran was added dropwise to a stirred mixture of 7.1 gm. of magnesium and 25 ml. of absolute tetrahydrofuran, the rate of dropwise addition being such that the 3-(N-trimethylsilyl-n-propylamino)-1-chloro-propane was provided as rapidly as it would react. After the reaction had gone to completion, the reaction mixture was stirred for 30 minutes at 60–70° C. and then allowed to cool to room temperature. Thereafter, while stirring the cold solution and cooling it exteriorly with water, a solution of 35 gm. of (4 - amino - 3,5 - dibromophenyl)-cyclohexyl-ketone in 150 ml. of absolute tetrahydrofuran was rapidly added dropwise. The reaction mixture was then stirred for one hour at room temperature and subsequently poured into a mixture of aqueous ammonium chloride and ice. The organic phase was separated, the aqueous phase was extracted twice with ether, the ether extract solutions were combined with the organic phase, and the combined solution was dried with sodium sulfate and evaporated in vacuo. The residual oil was suspended in ether, whereupon it crystallized, and recrystallized twice from ethanol, yielding the compound of the formula

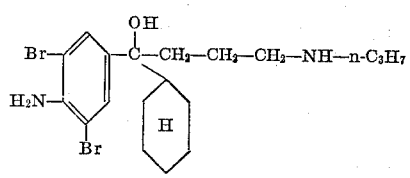

having a melting point of 137–139° C.

EXAMPLE 4

4 - amino-α-cyclohexyl-3,5-dibromo-α-[3′-(4″-hydroxy-piperidino)-n-propyl]-benzyl alcohol by method A.—A solution of 42.5 gm. of freshly distilled cyclohexyl bromide in 150 ml. of absolute tetrahydrofuran was added dropwise to a stirred mixture of 6.4 gm. of magnesium and 20 ml. of absolute tetrahydrofuran, the rate of dropwise addition being such that the cyclohexyl bromide was provided as rapidly as it would react. After all of the cyclohexyl bromide solution had been added, the reaction mixture was refluxed for 30 minutes and then allowed to cool to room temperature. Thereafter, while stirring the cold solution, a solution of 32 gm. of 4′-amino-3′,5′-dibromo-4-(4″-trimethylsilyloxy-piperidino)-butyrophenone in 200 ml. of absolute tetrahydrofuran was added dropwise thereto, and then the reaction mixture was refluxed for two hours, cooled, and poured into a mixture consisting of aqueous ammonium chloride and ice. The organic phase was separated, the aqueous phase was extracted twice with ether, the ether extract solutions were combined with the organic phase, and the combined solution was dried with sodium sulfate and evaporated in vacuo. The oily residue was purified by chromatography on a silicagel column, using benzene to which increasing amounts of acetone were added as the elution agent. The purified product was recrystallized twice from isopropanol, yielding the compound of the formula

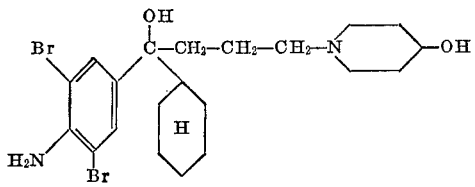

having a melting point of 161.5–163° C.

EXAMPLE 5

4-amino-3,5-dibromo-α-(4'-hydroxy-cyclohexyl)-α-(3"-piperidino-n-propyl)-benzyl alcohol by method A.— A solution of 159 gm. of freshly distilled 4-chlorotrimethylsilyloxy-cyclohexane and 5.7 ml. of ethyl bromide in 200 ml. of absolute ether was added dropwise to a stirred mixture of 20.8 gm. of magnesium and 70 ml. of absolute ether, the rate of dropwise addition being such that the ether boiled gently. After all of the solution had been added, the reaction mixture was refluxed for two hours and then cooled to room temperature. Thereafter, while stirring the cool solution, a solution of 68.5 gm. of 4'-amino - 3',5'-dibromo-4-piperidino-butyrophenone in 150 ml. of absolute tetrahydrofuran was added dropwise, and then the reaction mixture was refluxed for two hours, cooled, and poured into a mixture consisting of aqueous ammonium chloride and ice. The organic phase was separated, the aqueous phase was extracted once with ether, the ether extract solution was combined with the organic phase, and the combined solution was evaporated in vacuo. The residue was triturated with 2 N hydrochloric acid, and the insoluble matter was removed by vacuum filtration. The filtrate was washed with ether, made alkaline with sodium hydroxide, extracted twice with ether, and the combined ether extracts were dried over sodium sulfate and evaporated in vacuo. The residue was purified by chromatography on a silicagel column, using ethyl acetate, to which increasing amounts of acetone were added, as the elution agent. The purified product was briefly warmed in ether and collected by vacuum filtration after cooling, yielding the compound of the formula

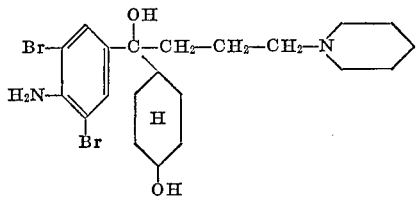

having a melting point of 158–160° C.

EXAMPLE 6

4 - amino - 3- bromo-α-cyclohexyl-α-(3'-pyrrolidino-n-propyl)-benzyl alcohol, M.P. 153–155° C., was prepared from 4-amino-3-bromo-phenyl)-cyclohexyl-ketone and 3-pyrrolidino-n-propyl chloride, analogous to Example 2.

EXAMPLE 7

4 - amino - 3 - bromo-α-cyclohexyl-α-(3'-piperidino-n-propyl)-benzyl alcohol, M.P. 137–139° C., was prepared from (4-amino-3-bromo-phenyl)-cyclohexyl-ketone and 3-piperidino-n-propyl cholride, analogous to Example 2.

EXAMPLE 8

4 - amino - 3 - bromo-α-cyclohexyl-α[(4'-methyl-piperazino)-n-propyl]-benzyl alcohol, M.P. 140–143° C., was prepared from (4 - amino - 3-bromo-phenyl)-cyclohexyl-ketone and 3 - (4'-methyl-piperazino)-n-propyl chloride, analogous to Example 2.

EXAMPLE 9

4 - amino -3 - bromo - α-phenyl-α-(3'-pyrrolidino-n-propyl)-benzyl alcohol, M.P. 109–111° C., was prepared from 4-amino-3-bromo-benzophenone and pyrrolidino-n-propyl chloride, analogous to Example 2.

EXAMPLE 10

4 - amino - 3 - bromo - α-phenyl-α-(3'-piperidino-n-propyl)-benzyl alcohol, M.P. 128–130° C., was prepared from 4 - amino-3-bromo-benzophenone and piperidino-n-propyl chloride, analogous to Example 2.

EXAMPLE 11

4 - amino - 3 - bromo-α-phenyl-α-(3'-hexamethyleneimino-n-propyl)-benzyl alcohol, M.P. 107–109° C., was prepared from 4-amino-3-bromo-benzophenone and hexamethyleneimino-n-propyl chloride, analogous to Example 2.

EXAMPLE 12

4 - amino -3 - bromo-α-(3'-diallylamino-n-propyl)-α-(4"-fluoro-phenyl)-benzyl alcohol, an oil (proof of structure by means of UV-, IR- and NMR-spectra), was prepared from 4-amino-3-bromo-UV-4'-fluoro-benzophenone and 3 - diallylamino-n-propyl chloride, analogous to Example 2.

EXAMPLE 13

4 - amino -3 - bromo-α-(4'-fluoro-phenyl)-α-(3"-pyrrolidino-n-propyl)-benzyl alcohol, M.P. 108–109° C., was prepared from 4 - amino-3-bromo-4'-fluoro-benzophenone and 3-pyrrolidino-n-propyl chloride, analogous to Example 2. Melting point of its ditoluenesulfonate: 190–194° C.

EXAMPLE 14

4 - amino - 3 -bromo-α-(4'-fluoro-phenyl)-α-(3"-piperidino-n-propyl)-benzyl alcohol, M.P. 121–123° C., was prepared from 4-amino-3-bromo-4'-fluoro-benzophenone and 3-piperidino-n-propyl chloride, analogous to Example 2.

EXAMPLE 15

4 - amino - 3 - bromo-α-(4'-fluoro-phenyl)-α-(3"-hexamethyleneimino-n-propyl)-benzyl alcohol, M.P. 125–127° C., was prepared from 4-amino-3-bromo-4'-fluoro-benzophenone and 3-hexamethyleneimino-n-propyl chloride, analogous to Example 2.

EXAMPLE 16

4 - amino - 3 - chloro-α-cyclohexyl-α-(3'-diethylamino-n-propyl)-benzyl alcohol, an oil (proof of structure by UV-, IR- and NMR-spectra), was prepared from (4-amino-3-chloro-phenyl)-cyclohexyl-ketone and 3-diethylamino-n-propyl chloride, analogous to Example 2.

EXAMPLE 17

4 - amino - 3 - chloro-α-cyclohexyl-α-(3'-pyrrolidino-n-propyl)-benzyl alcohol, M.P. 144–46° C., was prepared from (4-amino-3-chloro-phenyl)-cyclohexyl-ketone and 3-pyrrolidino-n-propyl chloride, analogous to Example 2.

EXAMPLE 18

4 - amino - 3 - chloro-α-cyclohexyl-α-(3'-piperidino-n-propyl)-benzyl alcohol, M.P. 123–126° C., was prepared from (4-amino-3-chloro-phenyl)-cyclohexyl-ketone and 3-piperidino-n-propyl chloride, analogous to Example 2.

EXAMPLE 19

4 - amino - 3 - chloro-α-cyclohexyl-α-[3'-(4"-methyl-piperazino)-n-propyl]-benzyl alcohol, M.P. 130–131° C., was prepared from (4-amino-3-chloro-phenyl)-cyclohexyl-ketone and 3-(4'-methyl-piperazino)-n-propyl chloride, analogous to Example 2.

EXAMPLE 20

4-amino-3-chloro - α - phenyl - α - (3'-pyrrolidino-n-propyl)-benzyl alcohol, M.P. 131–132° C., was prepared from 4-amino-3-chloro-benzophenone and 3-pyrrolidino-n-propyl chloride, analogous to Example 2.

EXAMPLE 21

4-amino-3-chloro-α-phenyl-α-(3' - piperidino-n-propyl)-benzyl alcohol, M.P. 115–116° C., was prepared from 4-amino-3-chloro-benzophenone and 3-piperidino-n-propyl chloride, analogous to Example 2.

EXAMPLE 22

4-amino-3-chloro-α-(3' - diallylamino-n-propyl)-α-(4''-fluoro-phenyl)-benzyl alcohol, an oil (proof of structure by UV-, IR- and NMR-spectra), was prepared from 4-amino-3-chloro-4'-fluoro-benzophenone and 3 - diallylamino-n-propyl chloride, analogous to Example 2.

EXAMPLE 23

4-amino-3-chloro-α-(4' - fluoro-phenyl)-α-(3''-pyrrolidino-n-propyl)-benzyl alcohol, M.P. 96–99° C., was prepared from 4-amino-3-chloro-4'-fluoro-benzophenone and 3-pyrrolidino-n-propyl chloride, analogous to Example 2.

EXAMPLE 24

4-amino-3-chloro-α-(4' - fluoro-phenyl)-α-(3'' - piperidino-n-propyl)-benzyl alcohol, M.P. 119–121° C., was prepared from 4-amino-3-chloro-4'-fluoro-benzophenone and 3-piperidino-n-propyl chloride, analogous to Example 2.

EXAMPLE 25

4-amino-3-chloro-α-(4' - fluoro-phenyl)-α-(3'' - hexamethyleneimino-n-propyl)-benzyl alcohol, M.P. of its oxalate: 111–113.5° C., was prepared from 4-amino-3-chloro - 4' - fluoro-benzophenone and 3 - hexamethyleneimino-n-propyl chloride, analogous to Example 2.

EXAMPLE 26

4-amino-3-bromo-5-chloro-α-cyclohexyl-α-(3' - pyrrolidino-n-propyl)-benzyl alcohol, M.P. 167–169° C., was prepared from (4-amino-3-bromo-5-chloro-phenyl)-cyclohexyl-ketone and 3-pyrrolidino-n-propyl chloride, analogous to Example 2.

EXAMPLE 27

4-amino - 3 - bromo-5-chloro-α-cyclohexyl-α-(3'-piperidino-n-propyl)-benzyl alcohol, M.P. 137–139° C., was prepared from (4-amino-3-bromo-5-chloro-phenyl)-cyclohexyl-ketone and 3-piperidino-n-propyl chloride, analogous to Example 2. M.P. of its hydrochloride: 139–141° C. (decomp.).

EXAMPLE 28

4-amino-3,5-dichloro-α-methyl-α-(3' - piperidino-n-propyl)-benzyl alcohol, M.P. 140–142° C., was prepared from 4'-amino-3',5'-dichloro-4-piperidino-butyrophenone and methyliodide, analogous to Example 1.

EXAMPLE 29

4-amino-α-cyclohexyl-3,5-dichloro - α - (3' - dimethylamino-n-propyl)-benzyl alcohol, M.P. 133–133.5° C., was prepared from (4-amino-3,5-dichloro-phenyl)-cyclohexyl-ketone and 3-dimethylamino-n-propyl chloride, analogous to Example 2.

EXAMPLE 30

4 - amino - α - cyclohexyl-α-(3'-diethylamino-n-propyl)-3,5-dichloro-benzyl alcohol, M.P. 85–86° C., was prepared from (4 - amino-3,5-dichloro-phenyl)-cyclohexyl-ketone and 3-diethylamino-n-propyl chloride, analogous to Example 2.

EXAMPLE 31

4-amino-α-cyclohexyl - 3,5 - dichloro-α-(3'-pyrrolidino-n-propyl)-benzyl alcohol, M.P. 161–162° C., was prepared from (4 - amino-3,5-dichloro-phenyl)-cyclohexyl-ketone and 3-pyrrolidino-n-propyl chloride, analogous to Example 2.

EXAMPLE 32

4 - amino - α - cyclohexyl-3,5-dichloro-α-(3'-piperidino-n-propyl)-benzyl alcohol, M.P. 143–145° C., was prepared from (4 - amino-3,5-dichloro-phenyl)-cyclohexyl-ketone and 3-piperidino-n-propyl chloride, analogous to Example 2.

EXAMPLE 33

4-amino - α - cyclohexyl-3,5-dichloro-α-(3'-morpholino-n-propyl)-benzyl alcohol, M.P. 78–80° C., was prepared from (4 - amino-3,5-dichloro-phenyl)-cyclohexyl-ketone and 3-morpholino-n-propyl chloride, analogous to Example 2.

EXAMPLE 34

4-amino-α-cyclohexyl - 3,5 - dichloro-α-(3'-hexamethyleneimino-n-propyl)-benzyl alcohol, M.P. 138–139.5° C., was prepared from (4-amino-3,5-dichloro-phenyl)-cyclohexyl-ketone and 3-hexamethyleneimino-n-propyl chloride, analogous to Example 2.

EXAMPLE 35

4-amino-α-cyclohexyl - 3,5 - dichloro-α-[3'-(N-methyl-piperazino)-n-propyl]-benzyl alcohol, M.P. 130–131° C., was prepared from (4-amino-3,5-dichloro-phenyl)-cyclohexyl-ketone and 3-(N-methyl-piperazino)-n-propyl chloride, analogous to Example 2.

EXAMPLE 36

4 - amino - 3,5 - dichloro - α - (3' - dimethylamino - n-propyl)-α-phenyl-benzyl alcohol, M.P. 151–151.5° C., was prepared from 4-amino-3,5-dichloro-benzophenone and 3-dimethylamino-n-propyl chloride, analogous to Example 2.

EXAMPLE 37

4 - amino - 3,5 - dichloro - α - phenyl - α - (3' - piperidino-n-propyl)-benzyl alcohol, M.P. 177.177.5° C., was prepared from 4-amino-3,5-dichloro-benzophenone and 3-piperidino-n-propyl chloride, analogous to Example 2.

EXAMPLE 38

4- amino - 3,5 - dichloro - α - [3' - (N - methyl - piperazino)-n-propyl]-α-phenyl-benzyl alcohol,, M.P. 138–139.5° C., was prepared from 4-amino-3,5-dichloro-benzophenone and 3-(N-methyl-piperazino)-n-propyl chloride, analogous to Example 2.

EXAMPLE 39

4 - amino - α - (4' - bromo - phenyl) - 3,5 - dichloro-α - (3'' - dimethylamino - n - propyl) - benzyl alcohol, M.P. 112.5–113.5° C., was prepared from 4-amino-4'-bromo-3,5-dichloro-benzophenone and 3-dimethylamino-n-propyl chloride, analogous to Example 2.

EXAMPLE 40

4 - amino - α - (4' - bromo - phenyl) - 3,5 - dichloro-α-(3''-piperidino-n-propyl)-benzyl alcohol, M.P. 135.5–136.5° C., was prepared from 4-amino-4'-bromo-3,5-dichloro-benzophenone and 3-piperidino-n-propyl chloride, analogous to Example 2.

EXAMPLE 41

4 - amino - α - (4' - bromo - phenyl) - 3,5 - dichloro - α-[3'-(5-methyl-piperazino)-n-propyl]-benzyl alcohol, M.P. 159–160.5° C., was prepared from 4-amino-4'-bromo-3,5-dichloro-benzophenone and 3-(N-methyl-piperazino)-n-propyl chloride, analogous to Example 2.

EXAMPLE 42

4 - amino - α - (4' - chloro - phenyl) - 3,5 - dichloro - α-(3''-dimethyl-amino - n - propyl) - benzyl alcohol, M.P. 111.5–112° C., was prepared from 4-amino-3,4',5-tri-

EXAMPLE 43

4 - amino - α - (4' - chloro - phenyl) - 3,5 - dichloro - α-(3''-piperidino-n-propyl)-benzyl alcohol, M.P. 136° C., was prepared from 4-amino-3,4',5-trichloro-benzophenone and 3-piperidino-n-propyl chloride, analogous to Example 2.

EXAMPLE 44

4 - amino - α - (4' - chloro - phenyl) - 3,5 - dichloro - α-[3''-(N-methyl-piperazino) - n - propyl] - benzyl alcohol, M.P. 159–160.5° C., was prepared from 4-amino-3,4',5-trichloro-benzophenone and 3-(N-methylpiperazino)-n-propyl chloride, analogous to Example 2.

EXAMPLE 45

4 - amino - 3,5 - dichloro - α - (3' - dimethylamino - n-propyl)-α-(4'''-fluoro-phenyl)-benzyl alcohol, M.P. 117–118° C., was prepared from 4-amino-3,5-dichloro-4'-fluoro-benzophenone and 3-dimethylamino-n-propyl chloride, analogous to Example 2.

EXAMPLE 46

4 - amino - 3,5 - dichloro - α - (4' - fluoro - phenyl) - α-(3''-piperidino-n-propyl)-benzyl alcohol M.P. 131.5–132.5° C., was prepared from 4-amino-3,5-dichloro-4'-fluoro-benzophenone and 3-piperidino-n-propyl chloride, analogous to Example 2.

EXAMPLE 47

4 - amino - 3,5 - dichloro - α - (4' - fluoro - phenyl) - α-[3''-(N-methyl - piperazino) - n - propyl] - benzyl alcohol, M.P. 135–136.5° C., was prepared from 4-amino-3,5-dichloro-4'-fluoro-benzophenone and 3-(N-methyl-piperazino)-n-propylchloride, analogous to Example 2.

EXAMPLE 48

4 - amino - α - (4' - anisyl) - 3,5 - dichloro - α - (3''-piperidino-n-propyl)-benzyl alcohol, M.P. 102–104° C., was prepared from 4-amino-3,5-dichloro-4'-methoxy-benzophenone and 3-piperidino-n-propyl chloride, analogous to Example 2.

EXAMPLE 49

4 - amino - 3,5 - dibromo - α - methyl - α - (3' - piperidino-n-propyl)-benzyl alcohol, M.P. 159–160° C., was prepared from 4'-amino-3.5'-dibromo-4-piperidino-butyrophenone and methyl iodide, analogous to Example 1.

EXAMPLE 50

4 - amino - α - ethyl - 3,5 - dibromo - α - (3' - piperidino-n-propyl)-benzyl alcohol, M.P. 123–125° C., was prepared from 4'-amino-3',5'-dibromo-4-piperidino-butyrophenone and ethyl bromide, analogous to Example 1.

EXAMPLE 51

4 - amino - 3,5 - dibromo - α - (3' - piperidino - n - propyl)-α-n-propyl-benzyl alcohol, M.P. 129–131° C., was prepared from 4'-amino-3,5-dibromo-4-piperidino-butyrophenone and n-propyl bromide, analogous to Example 1.

EXAMPLE 52

4 - amino - 3,5 - dibromo - α - (3' - piperidino - n - propyl)-α-tert.butyl-benzyl alcohol, M.P. 130–132° C., was prepared from (4-amino-3,5-dibromo-phenyl) tert.butyl-ketone and 3-piperidino-n-propyl chloride, analogous to Example 2.

EXAMPLE 53

4 - amino - α - cyclohexyl - 3,5 - dibromo - α - (3'-dimethylamino-n-propyl)-benzyl alcohol, M.P. 154–155° C., was prepared from (4-amino-3,5-dibromo-phenyl)-cyclohexyl-ketone and 3-dimethylamino-n-propyl chloride, analogous to Example 2.

EXAMPLE 54

4 - amino - α - cyclohexyl - 3,5 - dibromo - α - [3' - (N-methyl-ethylamino)-n-propyl]-benzyl alcohol, M.P. 135–136° C., was prepared from (4-amino-3,5-dibromo-phenyl)-cyclohexyl-ketone and 3-(N-methyl-ethylamino)-n-propyl chloride, analogous to Example 2.

EXAMPLE 55

4 - amino - α - cyclohexyl - α - (3' - diethylamino - n-propyl)-3,5-dibromo-benzyl alcohol, M.P. 85–86° C., was prepared from (4-amino-3,5-dibromo-phenyl)-cyclohexyl-ketone and 3-diethylamino-n-propyl chloride, analogous to Example 2.

EXAMPLE 56

4 - amino - α - cyclohexyl - 3,5 - dibromo - α - (3' - di-n-propylamino-n-propyl)-benzyl alcohol, M.P. 105–107° C., was prepared from (4-amino-3,5-dibromo-phenyl)-cyclohexyl-ketone and 3-di-n-propylamino-n-propyl chloride, analogous to Example 2.

EXAMPLE 57

4-amino - α - cyclohexyl-α-(3'-diallylamino-n-propyl)-3,5-dibromo-benzyl alcohol, M.P. 86–88° C., was prepared from (4 - amino-3,5-dibromo-phenyl)-cyclohexyl-ketone and 3-diallylamino-n-propyl chloride, analogous to Example 2.

EXAMPLE 58

4 - amino - α - cyclohexyl-3,5-dibromo-α-(3'-dibutyl-amino-n-propyl)-benzyl alcohol, M.P. 105–107° C., was prepared from (4-amino-3,5-dibromo-phenyl)-cyclohexyl-ketone and 3-dibutylamino-n-propyl chloride, analogous to Example 2.

EXAMPLE 59

4-amino - α- cyclohexyl-3,5-dibromo-α-(3'-pyrrolidino-n-propyl)-benzyl alcohol, M.P. 186.5–188° C., was prepared from (4 - amino-3,5-dibromo-phenyl)-cyclohexyl-ketone and 3-pyrrolidino-n-propyl chloride, analogous to Example 2.

EXAMPLE 60

4-amino - α - cyclohexyl-3,5-dibromo-α-(3'-piperidino-n-propyl)-benzyl alcohol, M.P. 121–124° C., was prepared from 4' - amino-3',5'-dibromo-4-piperidino-butyrophenone and cyclohexyl bromide, analogous to Example 1.

EXAMPLE 61

4 - amino - α - cyclohexyl-3,5-dibromo-α-[3'-(3''-hydroxy-piperidino)-n-propyl]-benzyl alcohol, M.P. 157–161° C., was prepared from 4'-amino-3',5'-dibromo-4-(3''-hydroxy-piperidino) - butyrophenone and cyclohexyl bromide, analogous to Example 1.

EXAMPLE 62

4-amino - α - cyclohexyl-3,5-dibromo-α-[3'-(2''-methyl -piperidino)-n-propyl]-benzyl alcohol, an amorphous substance (proof of structure by IR-, UV-, NMR-spectra), was prepared from 4'-amino-3',5'-dibromo-4-(2''-methyl-piperidino) - butyrophenone and cyclohexyl bromide, analogous to Example 1.

EXAMPLE 63

4-amino - α - cyclohexyl-3,5-dibromo-α-[3'-(3''-methyl-piperidino)-n-propyl]-benzyl alcohol, M.P. 120° C. crystal transformation, 137–139° C., was prepared from 4'-amino,3',5' - dibromo-4-(3'-methyl-piperidino) - butyrophenone and cyclohexyl bromide, analogous to Example 1.

EXAMPLE 64

4-amino - α - cyclohexyl-3,5-dibromo-α-[3'-(4''-methyl-piperidino)-n-propyl]-benzyl alcohol, M.P. 155–156° C., was prepared from 4'-amino-3',5'-dibromo-(4-(4''-methyl-piperidino)-butyrophenone and cyclohexyl bromide, analogous to Example 1.

EXAMPLE 65

4-amino-α-cyclohexyl-3,5-dibromo-α-(3'-hexamethyleneimino-n-propyl)-benzyl alcohol, M.P. 131–132° C., was prepared from (4-amino-3,5-dibromo-phenyl)-cyclohexyl-ketone and 3-hexamethyleneimino-n-propyl-chloride, analogous to Example 2.

EXAMPLE 66

4-amino-α-cyclohexyl-3,5-dibromo-α-(3'-morpholino-n-propyl)-benzyl alcohol, M.P. 116–117.5° C., was prepared from (4-amino-3,5-dibromo-phenyl)-cyclohexyl-ketone and 3-morpholino-n-propyl chloride, analogous to Example 2.

EXAMPLE 67

4-amino-α-cyclohexyl-3,5-dibromo-α-[3'-(N-methyl-N-cyclohexylamino)-n-propyl]-benzyl alcohol, M.P. 99–102° C., was prepared from (4-amino-3,5-dibromo-phenyl)-cyclohexyl-ketone and 3-(N-methyl-N-cyclohexylamino)-n-propyl chloride, analogous to Example 2.

EXAMPLE 68

4-amino-α-cyclohexyl-3,5-dibromo-α-[3'-(N-methyl-benzyl-amino)-n-propyl]-benzyl alcohol, M.P. 126–128° C., was prepared from (4-amino-3,5-dibromo-phenyl)-cyclohexyl-ketone and 3-(N-methyl-benzylamino)-n-propyl chloride, analogous to Example 2.

EXAMPLE 69

4-amino-α-cyclohexyl-3,5-dibromo-α-[3'-(N-methyl-anilino)-n-propyl]-benzyl alcohol, an oil (proof of structure by UV-, IR- and NMR-spectra), was prepared from (4-amino-3,5-dibromo-phenyl)-cyclohexylketone and 3-(N-methyl-anilino)-n-propyl chloride, analogous to Example 2.

EXAMPLE 70

4-amino-α-cyclohexyl-3,5-dibromo-α-(3'-camphidino-n-propyl)-benzyl alcohol, an oil (proof of structure by UV-, IR- and NMR-spectra), was prepared from (4-amino-3,5-dibromo-phenyl)-cyclohexyl-ketone and 3-camphidino-n-propyl chloride, analogous to Example 2.

EXAMPLE 71

4-amino-α-cyclohexyl-3,5-dibromo-α-[3'-(N-methyl-piperazino)-n-propyl]-benzyl alcohol, M.P. 140.5–141.5° C., was prepared from (4-amino-3,5-dibromo-phenyl)-cyclohexyl-ketone and 3-(N-methyl-piperazino)-n-propyl chloride, analogous to Example 2.

EXAMPLE 72

4-amino-α-(3'-ethylamino-n-propyl)-α-cyclohexyl-3,5-dibromo-benzyl alcohol, M.P. 131–133° C., was prepared from (4-amino-3,5-dibromo-phenyl)-cyclohexyl-ketone and 3-(N-ethyl-N-trimethylsilyl-amino)-n-propyl chloride, analogous to Example 3.

EXAMPLE 73

4-amino-α-cyclohexyl-3,5-dibromo-α-(3'-isopropyl-amino-n-propyl)-benzyl alcohol, M.P. 145–147° C., was prepared from (4-amino-3,5-dibromo-phenyl)-cyclohexyl-ketone and 3-(N-isopropyl-N-trimethyl-silyl-amino)-n-propyl chloride, analogous to Example 3.

EXAMPLE 74

4-amino-α-[3'-(2''-butylamino)-n-propyl]-α-cyclohexyl-3,5-dibromo-benzyl alcohol, M.P. 97–98° C., was prepared from (4-amino-3,5-dibromo-phenyl)-cyclohexyl-ketone and 3-[N-(2-butyl)-N-trimethylsilyl-amino]-n-propyl chloride, analogous to Example 3.

EXAMPLE 75

4-amino-α-(3'-cyclohexenyl)-3,5-dibromo-α-(3''-piperidino-n-propyl)-benzyl alcohol, M.P. 190–193° C., was prepared from (4-amino-3,5-dibromo-phenyl)-(3'-cyclohexenyl)-ketone and 3-piperidino-n-propyl chloride, analogous to Example 2.

EXAMPLE 76

4-amino-3,5-dibromo-α-(4'-methyl-cyclohexyl)-α-(3''-piperidino-n-propyl)-benzyl alcohol, M.P. 138–140° C., was prepared from (4-amino-3,5-dibromo-phenyl)-(4'-methyl-cyclohexyl)-ketone and 3-piperidino-n-propyl chloride, analogous to Example 2.

EXAMPLE 77

4-amino-3,5-dibromo-α-(3'-methyl-cyclohexyl)-α-(3''-piperidino-n-propyl)-benzyl alcohol, an amorphous substance (proof of structure by NMR-spectrum), was prepared from (4-amino-3,5-dibromo-phenyl)-(3'-methyl-cyclohexyl)-ketone and 3-piperidino-n-propyl chloride, analogous to Example 2.

EXAMPLE 78

4-amino-3,5-dibromo-α-(3',4'-dimethyl-cyclohexyl)-α-(3''-piperidino-n-propyl)-benzyl alcohol, an amorphous substance (proof of structure by IR-, UV- and NMR-spectra), was prepared from (4-amino-3,5-dibromo-phenyl)-(3',4'-dimethyl-cyclohexyl)-ketone and 3-piperidino-n-propyl chloride, analogous to Example 2.

EXAMPLE 79

4-amino-3,5-dibromo-α-(3',5'-dimethyl-cyclohexyl)-α-(3''-piperidino-n-propyl)-benzyl alcohol, M.P. 137–139° C., was prepared from (4-amino-3,5-dibromo-phenyl)-(3',5'-dimethyl-cyclohexyl)-ketone and 3-piperidino-n-propyl chloride, analogous to Example 2.

EXAMPLE 80

4-amino-α-cyclopropyl-3,5-dibromo-α-(3'-piperidino-n-propyl)-benzyl alcohol, M.P. 133–134° C., was prepared from (4-amino-3,5-dibromo-phenyl)-cyclopropyl-ketone and 3-piperidino-n-propyl chloride, analogous to Example 2.

EXAMPLE 81

4-amino-α-cyclopentyl-3,5-dibromo-α-(3'-piperidino-n-propyl)-benzyl alcohol, M.P. 141–142° C., was prepared from 4'-amino-3',5'-dibromo-4-piperidino-butyrophenone and cyclopentyl bromide, analogous to Example 1. M.P. of its hydrochloride: 139–141° C. (decomp.).

EXAMPLE 82

4-amino-α-cycloheptyl-3,5-dibromo-α-(3'-piperidino-n-propyl)-benzyl alcohol, M.P. 138–140° C., was prepared from 4'-amino-3',5'-dibromo-4-piperidino-butyrophenone and cycloheptyl bromide, analogous to Example 1.

EXAMPLE 83

4-amino-α-(cyclohexyl-methyl)-3,5-dibromo-α-(3'-piperidino-n-propyl)-benzyl alcohol, M.P. 150–153° C., was prepared from 4'-amino-3',5'-dibromo-4-piperidino-butyrophenone and cyclohexyl-methyl bromide, analogous to Example 1.

EXAMPLE 84

4-amino-3,5-dibromo-α-(2'-norbornyl)-α-(3''-piperidino-n-propyl)-benzyl alcohol, M.P. 114–115° C., was prepared from (4-amino-3,5-dibromo-phenyl)-(2-norbornyl)-ketone and 3-piperidino-n-propyl chloride, analogous to Example 2.

EXAMPLE 85

4-amino-3,5-dibromo-α-(3'-dimethylamino-n-propyl)-α-phenyl-benzyl alcohol, M.P. 169–170° C., was prepared from 4'-amino-3',5'-dibromo-4-dimethylamino-butyrophenone and bromobenzene, analogous to Example 1.

EXAMPLE 86

4-amino-3,5-dibromo-α-[3'-(N-methyl-piperazino)-n-propyl]-α-phenyl-benzyl alcohol, M.P. 168–169° C., was prepared from 4-amino-3,5-dibromo-benzophenone and 3-(N-methyl-piperazino)-n-propyl chloride, analogous to Example 2.

EXAMPLE 87

4-amino - α - (4'-bromo-phenyl)-3,5-dibromo-α-(3''-dimethylamino-n-propyl)-benzyl alcohol, M.P. 127–127.5° C., was prepared from 4-amino-3,4',5-tribromo-benzophenone and 3-dimethylamino-n-propyl chloride, analogous to Example 2.

EXAMPLE 88

4-amino - α - (4'-bromo-phenyl) - 3,5 - dibromo-α-(3''-piperidino-n-propyl)-benzyl alcohol, M.P. 154–155° C., was prepared from 4-amino-3,4',5-tribromo-benzophenone and 3-piperidino-n-propyl chloride, analogous to Example 2.

EXAMPLE 89

4-amino - α - (4'-bromophenyl)-3,5-dibromo-α-[3'-(N-methyl-piperazino)-n-propyl]-benzyl alcohol, M.P. 146–147° C., was prepared from 4-amino-3,4',5-tribromobenzophenone and 3-(N-methyl-piperazino)-n-propyl chloride, analogous to Example 2.

EXAMPLE 90

4-amino - α - (4'-chloro-phenyl)-3,5-dibromo-α-(3''-dimethylamino-n-propyl)-benzyl alcohol, M.P. 126° C., was prepared from 4'-amino-3',5'-dibromo-4-dimethylamino-butyrophenone and p-bromo-chlorobenzene, analogous to Example 1.

EXAMPLE 91

4-amino - α - (3'-chloro-phenyl) - 3,5 - dibromo-α-(3''-piperidino-n-propyl)-benzyl alcohol, M.P. 158–160° C., was prepared from 4-amino-3'-chloro-3,5-bromo-benzophenone and 3-piperidino-n-propyl chloride, analogous to Example 2.

EXAMPLE 92

4-amino - α - (4'-chloro-phenyl) - 3,5 - dibromo-α-(3''-piperidino-n-propyl)-benzyl alcohol, M.P. 150.5–151.5° C., was prepared from 4'-amino-3',5'-dibromo-4-piperidino-butyrophenone and p-bromo-chlorobenzene, analogous to Example 1. M.P. of its hydrochloride: 176–177° C. (decomp.).

EXAMPLE 93

4-amino - α - (4'-chlorophenyl)-3,5-dibromo-α-[3''-(N-methyl-piperazino)-n-propyl]-benzyl alcohol, M.P. 168.5–169.5° C., was prepared from 4-amino-4'-chloro-3,5-dibromo-benzophenone and 3-(N - methyl-piperazino)-n-propyl chloride, analogous to Example 2.

EXAMPLE 94

4-amino - 3,5 - dibromo - α - (3'-dimethylamino-n-propyl)-α-(4''-fluoro-phenyl)-benzyl alcohol, M.P. 130–131° C., was prepared from 4'-amino-3',5'-dibromo-4-dimethylamino-butyrophenone and p-bromo-fluorobenzene, analogous to Example 1.

EXAMPLE 95

4-amino - α - (3'-diethylamino-n-propyl)-3,5-dibromo-α-(4''-fluoro-phenyl)-benzyl alcohol, M.P. 75–76° C., was prepared from 4-amino-3,5-dibromo-4'-fluoro-benzophenone and 3-diethylamino-n-propyl chloride, analogous to Example 2.

EXAMPLE 96

4-amino - α - [3'-(diethylaminoethyl-amino)-n-propyl]-3,5-dibromo-α-(4''-fluoro-phenyl)-benzyl alcohol, M.P. of its oxalate: 197–200° C., was prepared from 4-amino-3,5-dibromo-4'-fluoro-benzophenone and 3-[N-trimethyl-silyl-(diethylaminoethyl-amino)]-n-propyl chloride, analogous to Example 3.

EXAMPLE 97

4-amino-3,5-dibromo-α-(3'-di-n-propylamino-n-propyl)-α-(4''-fluoro-phenyl)-benzyl alcohol, an oil (proof of structure by means of IR-, UV- and NMR-spectra), was prepared from 4-amino-3,5-dibromo-4'-fluoro-benzophenone and 3-di-n-propylamino-n-propyl chloride, analogous to Example 2.

EXAMPLE 98

4 - amino - 3,5 - dibromo-α-(3''-dibutylamino-n-propyl)-α-(4''-fluoro-phenyl)-benzyl alcohol, M.P. 72–74° C., was prepared from 4-amino-3,5-dibromo-4'-fluoro-benzophenone and 3-dibutylamino-n-propyl chloride, analogous to Example 2.

EXAMPLE 99

4 - amino - 3,5-dibromo-α-(4'-fluoro-phenyl)-α-(3''-pyrrolidino-n-propyl)-benzyl alcohol, M.P. 150–151.5° C., was prepared from 4-amino-3,5-dibromo-4'-fluoro-benzophenone and 3-pyrrolidino-n-propyl chloride, analogous to Example 2.

EXAMPLE 100

4 - amino-3,5-dibromo-α-(4'-fluoro-phenyl)-α-(3''-piperidino-n-propyl)-benzyl alcohol, M.P. 124.5–126° C., was prepared from 4'-amino-3',5'-dibromo-4-piperidino-butyrophenone and p-bromo-fluorobenzene, analogous to Example 1.

EXAMPLE 101

4-amino-3,5-dibromo-α-(3'-fluoro-phenyl)-α-(3'' - piperidino-n-propyl)-benzyl alcohol, M.P. 171.5–172.5° C., was prepared from 4-amino-3,5-dibromo-3'-fluoro-benzophenone and 3-piperidino-n-propyl chloride, analogous to Example 2.

EXAMPLE 102

4 - amino - 3,5-dibromo-α-(4'-fluoro-phenyl)-α-[3''-(2-methyl-piperidino)-n-propyl]-benzyl alcohol, M.P. 69–71° C., was prepared from 4-amino-3,5-dibromo-4'-fluoro-benzophenone and 3-(2'-methyl-piperidino) - n - propyl chloride, analogous to Example 2.

EXAMPLE 103

4 - amino-3,5-dibromo-α-(4'-fluoro-phenyl)-α-[3''-(3'''-methyl-piperidino)-n-propyl]-benzyl alcohol, M.P. 108–110° C., was prepared from 4-amino-3,5-dibromo-4'-fluoro-benzophenone and 3-(3'-methyl-piperidino)-n-propyl chloride, analogous to Example 2.

EXAMPLE 104

4 - amino-3,5-dibromo-α-(4'-fluoro-phenyl)-α-[3''-(4'''-methyl-piperidino)-n-propyl]-benzyl alcohol, M.P. 125.5–127.5° C., was prepared from 4-amino-3,5-dibromo-4'-fluoro-benzophenone and 3-(4'-methyl-piperidino)-n-propyl chloride, analogous to Example 2.

EXAMPLE 105

α-[3'-(2''-ethyl-piperidino)-n-propyl]-4-amino-3,5 - dibromo-α-(4'''-fluoro-phenyl)-benzyl alcohol, an oil (proof of structure by NMR-spectrum), was prepared from 4-amino - 3,5 - dibromo-4'-fluoro-benzophenone and 3-(2'-ethyl-piperidino)-n-propyl chloride, analogous to Example 2.

EXAMPLE 106

4 - amino - 3,5 - dibromo-α-[3'-(2'',6''-dimethyl-piperidino) - n - propyl]-α-(4'''-fluoro-phenyl)-benzyl alcohol, M.P. 172–173° C., was prepared from 4-amino-3,5-dibromo-4'-fluoro-benzophenone and 3-(2'',6''-dimethyl-piperidino)-n-propyl chloride, analogous to Example 2.

EXAMPLE 107

4 - amino-3,5-dibromo-α-dibromo-α-(4'-fluoro-phenyl)-α-[3''-(4'''-hydroxy-piperidino)-n-propyl]-benzyl alcohol, an amorphous substance (proof of structure by IR-, UV- and NMR-spectra), was prepared from 4'-amido-3',5'-dibromo-4-(4''-trimethylsilyloxy-piperidino) - butyrophenone and 4-bromo-fluorobenzene, analogous to Example 4.

EXAMPLE 108

4 - amino-3,5-dibromo-α-(4'-fluoro-phenyl)-α-(3''-hexamethylene-imino-n-propyl)-benzyl alcohol, M.P. 127.5–

129° C., was prepared from 4-amino-3,5-dibromo-4'-fluoro-benzophenone and 3-hexamethyleneimino-n-propyl chloride, analogous to Example 2.

EXAMPLE 109

4 - amino-3,5-dibromo-α-(4'-fluoro-phenyl)-α-(3''-morpholino-n-propyl)-benzyl alcohol, M.P. 127–128° C., was prepared from 4-amino-3,5-dibromo-4'-fluoro-benzophenone and 3-morpholino-n-propyl chloride, analogous to Example 2.

EXAMPLE 110

4 - amino - 3,5-dibromo-α-(4'-fluoro-phenyl)-α-[3''-(N-methyl-N-benzylamino)-n-propyl]-benzyl alcohol, an oil (proof of structure by IR-, UV- and NMR-spectra), was prepared of 4-amino-3,5-dibromo-4'-fluoro-benzophenone and 3 - (N - methyl-N-benzyl-amino)-n-propyl chloride, analogous to Example 2.

EXAMPLE 111

4 - amino - 3,5-dibromo-α-(4'-fluoro-phenyl)-α-[3''-(N-methyl-N-cyclohexyl-amino)-n-propyl] - benzyl alcohol, M.P. 90–91° C., was prepared from 4-amino-3,5-dibromo-4'-fluoro-benzophenone and 3-(N-methyl-N-cyclohexyl-amino)-n-propyl chloride, analogous to Example 2.

EXAMPLE 112

4 - amino - 3,5-dibromo-α-(4'-fluoro-phenyl)-α-[3''-(N-methyl-piperazino)-n-propyl]-benzyl alcohol, M.P. 138.5–139.5° C., was prepared from 4-amino-3,5-dibromo-4'-fluoro-benzophenone and 3-(N-methyl-piperazino)-n-propyl chloride, analogous to Example 2.

EXAMPLE 113

4-amino - 3,5 - dibromo-α-(4' - hydroxyphenyl)-α-(3''-piperidino-n-propyl)-benzyl alcohol, M.P. 212–214° C., was prepared from 4'-amino-3',5'-dibromo-4-piperidino-butyrophenone and 4 - bromo-trimethylsilyloxybenzene, analogous to Example 5.

EXAMPLE 114

4-amino-3,5-dibromo-α-(3'- piperidino-n-propyl)-α-(3''-tolyl)-benzyl alcohol, M.P. 165–165.5° C., was prepared from 4-amino-3,5-dibromo-3'-methyl-benzophenone and 3-piperidino-n-propyl chloride, analogous to Example 2.

EXAMPLE 115

4 - amino - 3,5 - dibromo-α-(3'-piperidinio-n-propyl)-α-(4''-tolyl)-benzyl alcohol, M.P. 143–144° C., was prepared from 4'-amino-3',5'-dibromo-4-piperidino-butyrophenone and 4-bromo-toluene, analogous to Example 1.

EXAMPLE 116

4 - amino-3,5-dibromo-α-(2',3'-dimethyl-phenyl)-α-(3''-piperidino-n-propyl)-benzyl alcohol, M.P. 144–146° C., was prepared from 4-amino-3,5-dibromo-2',3'-dimethyl-benzophenone and 3-piperidino-n-propyl chloride, analogous to Example 2.

EXAMPLE 117

4 - amino - 3,5 - dibromo-α-(3'-piperidino-n-propyl)-α-(3'' - α,α,α - trifluoro-tolyl) - benzyl alcohol, M.P. 141–141.5° C., was prepared from 4-amino-3,5-dibromo-3'-trifluoromethyl-benzophenone and 3-piperidino-n-propyl chloride, analogous to Example 2.

EXAMPLE 118

4 - amino - 3,5 - dibromo-α-(3' - piperidino-n-propyl)-α-(4'' - α,α,α-trifluoro-tolyl)-benzyl alcohol, M.P. 118–119° C., was prepared from 4'-amino-3',5'-dibromo-4-piperidino-butyrophenone and 4 - bromo-α,α,α-trifluorotoluene, analogous to Example 1.

EXAMPLE 119

4 - amino - α - (4'-anisyl)-3,5-dibromo-α-(3''-piperidino-n-propyl)-benzyl alcohol, M.P. 123–125° C., was prepared from 4 - amino-3,5-dibromo-4'-methoxy-benzophenone and 3-piperidino-n-propyl chloride, analogous to Example 2.

EXAMPLE 120

4 - amino - α - benzyl-3,5-dibromo-α-(3'-piperidino-n-propyl)-benzyl alcohol, M.P. 145.5–147.5° C., was prepared from 4' - amino-3',5'-dibromo-4-piperidino-butyrophenone and benzyl chloride, analogous to Example 1.

EXAMPLE 121

4 - amino - 3,5 - dibromo-α-(3'-piperidino-n-propyl)-α-(2''-pyridyl)-benzyl alcohol, M.P. 190–192° C., was prepared from 4' - amino-3',5'-dibromo-4-piperidino-butyrophenone and 2-bromo-pyridine, analogous to Example 1.

EXAMPLE 122

4 - amino - 3,5 - dibromo-α-(3'-piperidino-n-propyl)-α-(2''-thienyl)-benzyl alcohol, M.P. 176–178° C., was prepared from (4 - amino-3,5-dibromo-phenyl)-(2'-thienyl)-ketone and 3-piperidino-n-propyl chloride, analogous to Example 2.

EXAMPLE 123

4 - amino - 3 - bromo-5-chloro-α-phenyl-α-(3'-pyrrolidino-n-propyl)-benzyl alcohol, M.P. 187–189° C., was prepared from 4-amino-3-bromo-5-chloro-benzophenone and 3-pyrrolidino-n-propyl chloride, analogous to Example 2.

EXAMPLE 124

4 - amino - 3 - bromo-5-chloro-α-phenyl-α-(3'-piperidino-n-propyl)-benzyl alcohol, M.P. 183–184° C., was prepared from 4-amino-3-bromo-5-chloro-benzophenone and 3-piperidino-n-propyl chloride, analogous to Example 2.

EXAMPLE 125

4 - amino - 3 - bromo-5-chloro-α-phenyl-α-(3' - hexamethyleneimino - n - propyl)-benzyl alcohol, M.P. 177–179° C., was prepared from 4-amino-3-bromo-5-chloro-benzophenone and 3-hexamethyleneimino-n-propyl chloride, analogous to Example 2.

EXAMPLE 126

4 - amino - 3 - bromo-5-chloro-α-(3' - diallylamino-n-propyl) - α - (4'' - fluoro-phenyl)-benzyl alcohol, an oil (proof of structure by UV-, IR- and NMR-spectra), was prepared from 4-amino-3-bromo-5-chloro-benzophenone and 3-diallylamino-n-propyl chloride, analogous to Example 2.

EXAMPLE 127

4 - amino - 3 - bromo-5-chloro-α-(4'-fluoro-phenyl-α-(3'' - pyrrolidino-n-propyl) - benzyl alcohol, M.P. 139–140° C., was prepared from 4-amino-3-bromo-5-chloro-4'-fluoro-benzophenone and 3-pyrrolidino-n-propyl chloride, analogous to Example 2.

EXAMPLE 128

4 - amino - 3 - bromo-5-chloro-α-(4'-fluoro-phenyl)-α-(3'' - piperidino - n - propyl)-benzyl alcohol, M.P. 128–129.5° C., was prepared from 4-amino-3-bromo-5-chloro-4'-fluoro-benzophenone and 3 - piperidino-n-propyl chloride, analogous to Example 2.

EXAMPLE 129

4 - amino - 3 - bromo-5-chloro-α-(4'-fluoro-phenyl)-α-(3''-hexamethyleneimino-n-propyl)-benzyl alcohol, M.P. 122–125° C., was prepared from 4-amino - 3 - bromo-5-chloro - 4' - fluoro-benzophenone and 3 - hexamethyleneimino-n-propyl chloride, analogous to Example 2.

EXAMPLE 130

4-amino - 3,5 - dibromo-α-(2'-methoxy-phenyl)-α-(3''-piperidino-n-propyl)-benzyl alcohol, M.P. 139–141° C., was prepared from 4-amino - 3,5 - dibromo-2'-methoxy-benzophenone and 3-piperidino-n-propyl chloride, analogous to Example 2.

EXAMPLE 131

4 - amino - 3,5 - dibromo-α-(3'-piperidino-n-propyl)-α-(2''-trifluoro-methyl-phenyl)-benzyl alcohol, M.P. 155–156° C., was prepared from 4-amino-3,5-dibromo-2'-trifluoromethyl - benzophenone and 3 - piperidino-n-propyl chloride, analogous to Example 2.

EXAMPLE 132

4 - amino - 3,5 - dibromo-α-(2'-methyl-phenyl)-α-(3''-piperidino-n-propyl)-benzyl alcohol, M.P. 183–185° C., was prepared from 4 - amino - 3,5 - dibromo-2'-methyl-benzophenone and 3-piperidino-n-propyl chloride, analogous to Example 2.

EXAMPLE 133

4 - amino - 3 - bromo-α-cyclohexyl-α-(3'-diethylamino-n-propyl)-benzyl alcohol, an oil (proof of structure by UV-, IR- and NMR-spectra), was produced from (4-amino-3-bromo-phenyl)-cyclohexyl-ketone and 3-diethylamino-n-propyl chloride, analogous to Example 2.

EXAMPLE 134

4 - amino - 3 - chloro - α - (3'-hexamethyleneimino-n-propyl)-α-phenyl-benzyl alcohol, M.P. 95–96° C., was prepared from 4 - amino-3-chloro-benzophenone and 3-hexamethyleneimino-n-propyl chloride, analogous to Example 2.

EXAMPLE 135

4-amino - 3,5 - dibromo-α-(4'-phenoxy-phenyl)-α-(3''-piperidino-n-propyl)-benzyl alcohol, an amorphous substance (proof of structure by IR-, UV- and NMR-spectra), was prepared from 4 - amino-3,5-dibromo-4'-phenoxy-benzophenone and 3 - piperidino-n-propyl chloride, analogous to Example 2.

EXAMPLE 136

4 - amino - 3,5 - dibromo - α - (4'-diphenylyl)-α-(3''-piperidino-n-propyl)-benzyl alcohol, an amorphous substance (proof of structure by IR-, UV- and NMR-spectra), was prepared from (4 - amino - 3,5 - dibromo-phenyl)-diphenylyl-ketone and 3-piperidino-n-propyl chloride, analogous to Example 2.

EXAMPLE 137

4-amino - 3,5 - dibromo-α-(4'-fluoro-phenyl)-α-(3''-n-propyl-amino-n-propyl)-benzyl alcohol, an oil (proof of structure by IR-, UV- and NMR-spectra), was prepared from 4-amino-3,5-dibromo-4'-fluoro-benzophenone and 3-(N-n-propyl - N - trimethylsilyl-amino)-n-propyl chloride, analogous to Example 3.

EXAMPLE 138

4-amino - 3 - bromo - 5 - chloro-α-cyclohexyl-α-(3'-n-propylamino-n-propyl)-benzyl alcohol, an oil (proof of structure by IR-, UV- and NMR-spectra), was prepared from (4-amino - 3 - bromo-5-chloro-phenyl)-cyclohexyl-ketone and 3-(N-n-propyl-N-trimethylsilyl-amino)-n-propyl chloride, analogous to Example 3.

EXAMPLE 139

4-amino - 3 - bromo - α - (4'-fluoro-phenyl)-α-(3''-n-propylamino-n-propyl)-benzyl alcohol, an oil (proof of structure by IR-, UV- and NMR-spectral), was prepared from 4-amino-3-bromo-4'-fluoro-benzophenone and 3-(N-n-propyl-N-trimethylsilyl-amino)-n-propyl chloride, analogous to Example 3.

EXAMPLE 140

4-amino - α - cyclohexyl - α - [3'-diethylamino-ethyl-amino)-n-propyl] - 3,5 - dibromo - benzylalcohol, an oil (proof of structure by IR-, UV- and NMR-spectra), was prepared from 4-amino - 3,5 - dibromo-phenyl-cyclohexyl-ketone and 3-[(N-trimethylsilyl - N - diethylaminoethyl) amino]-n-propyl chloride, analogous to Example 3.

EXAMPLE 141

4-amino - 3,5 - dibromo - α - (1'-naphthyl) - α - (3''-piperidino-n-propyl)-benzyl alcohol, M.P. 192–194° C. (decomp.), was prepared from (4-amino - 3,5 - dibromo-phenyl) - (1' - naphthyl)-ketone and 3-piperidino-n-propyl chloride, analogous to Example 2.

EXAMPLE 142

4-amino - 3,5 - dibromo - α - (2'-naphthyl) - α - (3''-piperidino-n-propyl)-benzyl alcohol, an amorphous substance (proof of structure by IR-, UV- and NMR-spectra), was prepared from (4-amino-3,5-dibromo-phenyl)-(2'-naphthyl)-ketone and 3-piperidino-n-propyl chloride, analogous to Example 2.

EXAMPLE 143

4-amino - 3,5 - dibromo - α - (3'-piperidino-n-propyl)-α-(4''-thioanisyl)-benzyl alcohol, M.P. 142.5–144.5° C., was prepared from 4-amino - 3,5 - dibromo-4'-methylthio-benzophenone, analogous to Example 2.

EXAMPLE 144

4-amino - 3,5 - dibromo - α - (4'-fluoro-phenyl)-α-(3''-isopropyl-amino-n-propyl)-benzyl alcohol, an amorphous substance (proof of structure by IR-, UV- and NMR-spectra), was prepared from 4 - amino - 3,5 - dibromo-4'-fluoro-benzophenone and 3-[(N-isopropyl - N - trimethylsilyl)-amino]-n-propyl chloride, analogous to Example 3.

EXAMPLE 145

4-amino - 3,5 - dibromo - α - phenyl - α - (3'-piperidino-n-propyl)-benzyl alcohol by method A.—A solution of 6.28 gm. of bromobenzene in 40 ml. of absolute ether was added dropwise to a stirred mixture of 0.6 gm. of lithium and 30 ml. of absolute ether in an atmosphere of nitrogen. After all of the bromobenzene solution had been added, the reaction mixture was refluxed for three hours and was then filtered through a cotton plug. A solution of 4.04 gm. of 4'-amino-3',5'-dibromo-4-piperidino-butyrophenone in 120 cc. of absolute ether was added dropwise to the stirred filtrate in an atmosphere of nitrogen over a period of 20 minutes, and the mixture was then boiled for 30 minutes and thereafter poured into ice water. The organic phase was separated, the aqueous phase was extracted with ether. The ether extracts were washed with water, dried with magnesium sulfate and combined with the previously separated ether phase, and the combined ethereal solution was evaporated in vacuo. The residue was caused to crystallize by addition of isopropanol, and the crystalline product was recrystallized from ethanol, yielding the same compound as in Example 1, M.P. 183–185° C.

EXAMPLE 146

4 - amino - 3,5 - dichloro - α - (3' - dimethylamino-n-propyl)-α-phenyl-benzyl alcohol, M.P. 151–151.5° C., was prepared from 4'-amino - 3',5' - dichloro-4-dimethylamino-butyrophenone and phenyllithium, analogous to Example 145.

EXAMPLE 147

4-amino - 3 - bromo - 5 - chloro - α - phenyl-α-(3-pyrrolidinopropyl)-benzyl alcohol, M.P. 187–189° C., was prepared from 4'-amino-3'-bromo-5'-chloro-4-pyrrolidino-butyrophenone and phenyl lithium, analogous to Example 145.

EXAMPLE 148

4-amino - 3,5 - dibromo - α - (3'-piperidino-n-propyl)-α-(p-tolyl)-benzyl alcohol, M.P. 143–144° C., was prepared from 4'-amino - 3',5' - dibromo-4-piperidino-butyrophenone and p-tolyl lithium, analogous to Example 145.

EXAMPLE 149

4-amino - 3,5 - dibromo - α - (3'-piperidino-n-propyl)-α-(2''-thienyl)-benzyl alcohol, M.P. 176–178° C., was prepared from 4'-amino - 3',5 ' -dibromo - 4 - piperidino-butyrophenone and α-thienyl lithium, analogous to Example 145.

EXAMPLE 150

4-amino - 3,5 - dibromo - α - (2'-methoxy-phenyl)-α-(3''-piperidino-n-propyl)-benzyl alcohol, M.P. 139–141° C., was prepared from 4'-amino-3',5'-dibromo-4-piperidino-butyrophenone and 2-methoxy-phenyl lithium, analogous to Example 145.

EXAMPLE 151

4-amino - 3 - chloro - α - cyclohexyl - α - (3'-hexamethyleneimino-n-propyl)-benzyl alcohol, an oil (proof of structure by IR-, UV- and NMR-spectra), was prepared from (4-amino-3-chloro-phenyl)-cyclohexyl-ketone and 3-hexamethyleneimino-n-propyl chloride, analogous to Example 2.

EXAMPLE 152

4-amino - 3 - bromo - 5 - chloro - α - cyclohexyl-α-(3'-hexamethylene-imino-n-propyl)-benzyl alcohol, M.P. 135–136 C., was prepared from (4-amino-3-bromo-5-chlorophenyl)-cyclohexyl-ketone and 3-hexamethyleneimino-n-propyl chloride, analogous to Example 2.

EXAMPLE 153

4-amino-3,5-dibromo-α-(3 - hexamethyleneimino - n-propyl)-α-(2''-methyl-phenyl)-benzyl alcohol, M.P. 182–183° C., was prepared from 4-amino-3,5-dibromo-2'-methyl-benzophenone and 3-hexamethyleneimino-n-propyl cloride, analogous to Example 2.

EXAMPLE 154

4-amino-3,5-dibromo-α-(3'-hexamethyleneimino-n-propyl)-α-(2''-trifluoromethyl-phenyl)-benzyl alcohol, M.P. 135–137° C., was prepared from 4-amino-3,5-dibromo-2'-trifluoromethyl-benzophenone and 3-hexamethyleneimino-n-propyl chloride, analogous to Example 2.

EXAMPLE 155

4-amino-3,5-dibromo-α-(3' - hexamethyleneimino - n-propyl)-α-(2''-hydroxy-phenyl)-benzyl alcohol, M.P. 197–199° C., was prepared from 4-amino-3,5-dibromo-2'-hydroxy-benzophenone and 3-hexamethyleneimino-n-propyl chloride, analogous to Example 2.

EXAMPLE 156

4-amino-3,5-dibromo-α-(3'-pyrrolidino-n - propyl) - α-(2''-thienyl)-benzyl alcohol, M.P. 194–195° C. (decomp.), was prepared from (4-amino-3,5-dibromo-phenyl) - (2-thienyl)-ketone and 3-pyrrolidino - n - propyl chloride, analogous to Example 2.

EXAMPLE 157

4-amino-3,5-dibromo-α-(3' - hexamethyleneimino - n-propyl)-α-(2''-thienyl)-benzyl alcohol, M.P. 154–156° C., was prepared from (4-amino-3,5-dibromo-phenyl) - (2-thienyl)-ketone and 3-hexamethyleneimino-n-propyl chloride, analogous to Example 2.

EXAMPLE 158

4-amino-3,5-dibromo-α-(3'-piperidino-n-propyl)-α-(3''-thienyl)-benzyl alcohol, M.P. 176–178° C.. was prepared from (4-amino-3,5-dibromo-phenyl)-(3-thienyl) - ketone and 3-piperidino-n-propyl chloride, analogous to Example 2.

EXAMPLE 159

4-amino-α-cyclohexyl-3,5-dibromo-α-[3'-(4'' - methoxy-piperidino)-n-propyl]-benzyl alcohol, M.P. 153–153.5° C., was prepared from (4-amino-3,5-dibromo-phenyl)-cyclohexyl-ketone and 3-(4'-methoxy-piperidino)-n-propyl chloride, analogous to Example 2.

EXAMPLE 160

4-amino-3-bromo-α-methyl-α-(3'-pyrrolidino-n-propyl)-benzyl alcohol, M.P. 87–88° C., was prepared from 4-amino-3-bromo-acetophenone and 3-pyrrolidino-n-propyl chloride, analogous to Example 2.

EXAMPLE 161

4-amino-3-bromo-α-cyclohexyl-α-(3' - morpholino - n-propyl)-benzyl alcohol, M.P. 113–114° C., was prepared from (4-amino-3-bromo-phenyl)-cyclohexyl-ketone and 3-morpholino-n-propyl chloride, analogous to Example 2.

EXAMPLE 162

4-amino-3-bromo-α-cyclohexyl-α - (3' - hexamethylene-imino-n-propyl)-benzyl alcohol, M.P. 103–105° C., was prepared from (4-amino-3-bromo-phenyl)-cyclohexyl-ketone and hexamethyleneimino-n-propyl chloride, analogous to Example 2. M.P. of its hydrochloride: 146–150° C.

EXAMPLE 163

4-amino-α-cyclohexyl-3,5-dibromo-α-[3' - (4'' - phenyl-piperazino)-n-propyl]-benzyl alcohol, M.P. 140–142° C., was prepared from (4-amino-3,5-dibromophenyl)-cyclohexyl-ketone and 3-(4'-phenyl-piperazino)-n-propyl chloride, analogous to Example 2.

EXAMPLE 164

4-amino-3,5-dibromo-α-(4'-fluoro-phenyl)-α-[3'' - (4'''-methoxy-piperidino)-n-propyl]-benzyl alcohol, M.P. 162–162.5° C., was prepared from 4amino-3,5-dibromo-4'-fluoro-benzophenone and 3-(4'-methoxy-piperidino)-n-propyl chloride, analogous to Example 2.

EXAMPLE 165

4-amino-3-bromo-α-(3'-pyrrolidino-n-propyl)-α - (2''-thienyl)-benzyl alcohol, M.P. 130–131° C., was prepared from (4-amino-3-bromo-phenyl)-2-(thienyl)-ketone and 3-pyrrolidino-n-propyl chloride, analogous to Example 2.

EXAMPLE 166

4-amino-3-bromo-α-cyclopentyl-α-(3' - pyrrolidino - n-propyl)-benzyl alcohol, M.P. 136–137° C., was prepared from (4-amino-3-bromo-phenyl)-cyclopentyl-ketone and 3-pyrrolidino-n-propyl chloride, analogous to Example 2.

EXAMPLE 167

4-amino-3-bromo-α-cycloheptyl-α-(3' - pyrrolidino - n-propyl)-benzyl alcohol, M.P. 145–147° C., was prepared from (4-amino-3-bromo-phenyl)-cycloheptyl-ketone and 3-pyrrolidino-n-propyl chloride, analogous to Example 2.

EXAMPLE 168

4-amino-3-bromo-α-cyclohexyl-α-[3'-(4'' - methylpiperidino)-n-propyl]-benzyl alcohol, M.P. 153–155° C., was prepared from (4-amino-3-bromo-phenyl)-cyclohexyl-ketone and 3-(4'-methyl-piperidino)-n-propyl chloride, analogous to Example 2.

EXAMPLE 169

4-amino-3-bromo-α-cyclohexyl-α-[3' - (4'' - hydroxy-piperidino)-n-propyl]-benzyl alcohol, M.P. 111–113° C., was prepared from 4'-amino-3'-bromo-4-(4''-trimethyl-silyloxy-piperidino)-butyrophenone and cyclohexyl bromide, analogous to Example 4.

EXAMPLE 170

4-amino-3,5-dibromo-α-(4'-hydroxy-cyclohexyl)-α-[3''-(4'''-hydroxy-piperidino-n - propyl] - benzyl alcohol by Method A.—A solution of 270 gm. of 4-trimethylsilyloxy-cyclohexyl chloride in 250 ml. of absolute ether was added dropwise to a stirred mixture of 32 gm. of magnesium shavings and 100 ml. of absolute ether, the rate of dropwise addition being such that the ether was kept gently boiling. After all of the solution had been added, the mixture was stirred and refluxed for 90 minutes and was then cooled to room temperature. While stirring the cool solution, a solution of 128.8 gm. of 4'-amino-3',5'-dibromo-4-(4''-trimethylsilyloxy-piperidino)-butyrophenone in 300 ml. of absolute tetrahydrofuran was added dropwise thereto, and then the mixture was refluxed for two hours, cooled and poured into a mixture of aqueous ammonium chloride and ice. The organic phase was separated, the aqueous phase was extracted twice with ether, and the ether extracts were combined with the previously separated organic phase. The combined organic solution was extracted with 2 N hydrochloric acid, and the aqueous acidic extract was then made alkaline with concentrated ammonia and subsequently extracted with chloroform. The chloroform extract solution was dried with sodium sulfate and evaporated to dryness in vacuo. The solid residue was extracted once with boiling ethanol, the insoluble matter was filtered off while still hot, and the filter cake was washed with ethanol, yielding the compound of the formula

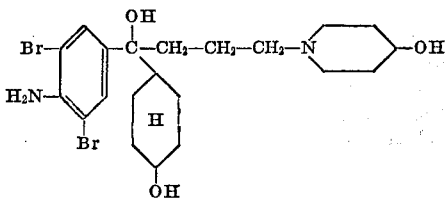

having a melting point of 227–229° C.

EXAMPLE 171

4-amino-α-cyclohexyl-3,5-dibromo-α-(3'-piperidino - n-propyl)-benzyl alcohol by Method C.—10 gm. of 4-amino-α-cyclohexyl-α-(3'-piperidino-n-propyl) - benzyl alcohol were dissolved in 150 ml. of acetic acid, and, while stirring the solution, 10.1 gm. of bromine were slowly added dropwise thereto, whereby a turbidity formed. Upon addition of 50 ml. of ethanol a clear solution was obtained which was stirred into a mixture of sodium hydroxide and ice, taking care that the pH of the mixture always remained in the alkaline range. Thereafter, the resulting mixture was extracted with chloroform, the extract solution was dried with sodium sulfate, and the chloroform was evaporated therefrom in vacuo. The residue was triturated with petroleum ether which contained a small amount of ethanol, and the crystallized product was collected by vacuum filtration, washed with petroleum ether and recrystallized once from ethanol, yielding the same compound as in Example 2, M.P. 121–124° C.

Its hydrochloride had a melting point of 139–141° C. (decomp.).

Its p-toluene-sulfonate had a melting point of 127.5–129.5° C. (decomp.).

EXAMPLE 172

4-amino-α-cyclohexyl-3,5-dibromo-α-(3'-piperidino - n-propyl)-benzyl alcohol by Method C.—1 gm. of 4-amino-3-bromo-α-cyclohexyl-α-(3'-piperidino-n-propyl) - benzyl alcohol was dissolved in 40 ml. of acetic acid, and, while stirring the solution, a solution of 0.49 gm. of bromine in 5 ml. of acetic acid was added dropwise thereto. The resulting mixture was stirred for one hour at room temperature and then stirred into a mixture of sodium hydroxide and ice, taking care that the pH of the mixture always remained in the alkaline range. Thereafter, the alkaline mixture was extracted with chloroform, the extract solution was dried with sodium sulfate, and the chloroform was evaporated therefrom in vacuo. The residue was triturated with petroleum ether containing a littel ethanol, the resulting crystalline product was collected by vacuum filtration, and the filter cake was washed with petroleum ether and recrystallized once from ethanol, yielding the same compound as in Example 171, M.P. 121–124° C.

EXAMPLE 173

4-amino-3-bromo-α-cyclohexyl-α-(3' - piperidino - n-propyl)-benzyl alcohol by Method C.—10 gm. of 4-amino-α-cyclohexyl-α-(3'-piperidino-n-propyl) - benzyl alcohol were dissolved in 150 ml. of acetic acid, and, while stirring the solution at 15° C., a solution of 5.05 gm. of bromine in 50 ml. of acetic acid was slowly added dropwise thereto. The resulting solution was stirred into a mixture of ice and 10 N sodium hydroxide, taking care that the pH of the mixture always remained in the alkaline range. Thereafter, the aqueous alkaline mixture was extracted with chloroform, the extract solution was dried with sodium sulfate, and the chloroform was evaporated therefrom in vacuo. The residue was purified by chromatography on 400 gm. of basic ammonium oxide (Woehm, activity stage I), using as the elution agent chloroform to which increasing amounts of ethylacetate were added up to a ratio of 1:1. The fractions containing the described reaction product were combined and evaporated to dryness in vacuo, and the residue was crystallized from petroleum ether/ethanol, yielding the compound of the formula

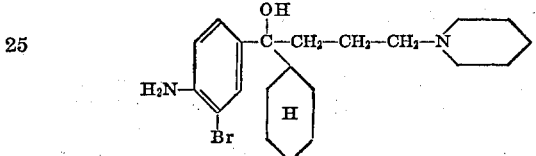

having a melting point of 137–139° C.

EXAMPLE 174

4-amino-α-cyclohexyl-3,5-dichloro-α-(3'-piperidino - n-propyl)-benzyl alcohol by Method C.—25 gm. of 4-amino-α-cyclohexyl-α-(3'-piperidino-n-propyl) - benzyl alcohol were dissolved in 250 ml. of acetic acid, 25 gm. of sodium acetate were added to the solution, and then, while stirring the mixture, a solution of 9.75 gm. of chlorine in 150 ml. of acetic acid was added all at once. Thereafter, the resulting mixture was stirred into a mixture consisting of ice and 10 N sodium hydroxide, taking care that the pH of the mixture always remained in the alkaline range. The aqueous alkaline mixture was then extracted with chloroform, the extract solution was washed with aqueous sodium bisulfite, dried with sodium sulfate, and the chloroform was evaporated therefrom in vacuo. The residue was chromatographed on 300 gm. of silicagel, using ethylacetate as the eluant, and the fractions containing the desired reaction product were combined and evaporated in vacuo to dryness. The residue was dissolved in acetone, the solution was boiled in the presence of activated charcoal and then filtered, the filtrate was again evaporated to dryness, and the residue was recrystallized from ethanol, yielding the compound of the formula

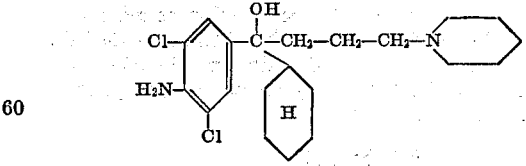

having a melting point of 143–145° C.

EXAMPLE 175

4-amino-α-cyclohexyl - 3,5 - dichloro-α-(3'-piperidino-n-propyl)-benzyl alcohol by Method C.—4 gm. of 4 - amino - 3 - chloro-α-cyclohexyl-α-(3'-piperidino-n-propyl)-benzyl alcohol were dissolved in 100 ml. of acetic acid and, while stirring the solution, a solution of 0.8 gm. of chlorine in 20 ml. of acetic acid was added thereto all at once. The resulting mixed solution was stirred for one hour at room temperature and was then poured into a mixture consisting of ice and 10 N sodium hydroxide, taking care that the pH of the mixture always remained in the alkaline range. Thereafter, the alkaline aqueous mixture was extracted with chloroform, the extract solution was dried with sodium sulfate, and the chloroform was evaporated therefrom in vacuo. The residue was chromatographed on 40 gm. of silicagel, using ethylacetate as the eluant. The fractions containing the desired reaction product were combined, evaporated to dryness in vacuo, and the residue was recrystallized from petroleum ether/ethanol, yielding the same compound as in Example 174, M.P. 143–145° C.

EXAMPLE 176

4-amino-3-bromo - 5 - chloro-α-cyclohexyl-α-(3′-piperidino-n-propyl)-benzyl alcohol by Method C.—5 gm. of 4 - amino - 3 - bromo-α-cyclohexyl-α-(3′-piperidino-n-propyl)-benzyl alcohol were dissolved in 100 ml. of acetic acid and, while stiring the resulting solution, a solution of 1 gm. of chlorine in 20 ml. of acetic acid was added all at once thereto. The mixed solution was stirred for one hour at room temperature and then poured into a mixture consisting of ice and an excess of 10 N sodium hydroxide. The aqueous alkaline mixture was extracted with chloroform, the extract solution was dried with sodium sulfate, and the chloroform was evaporated therefrom in vacuo. The residue was chromatographed on 50 gm. of silicagel, using ethylacetate as the eluant. The fractions containing the desired reaction product were combined, evaporated to dryness in vacuo, and the residue was recrystallized from petroleum ether/ethanol, yielding the compound of the formula

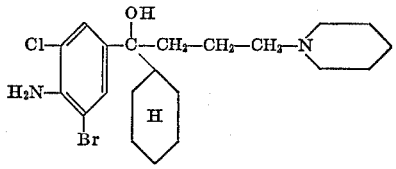

having a melting point of 137–139° C.

Its hydrochloride had a melting point of 139–141° C. (decomp.).

EXAMPLE 177

4-amino-3-bromo - 5 - chloro-α-cyclohexyl-α-(3′-piperidino-n-propyl)-benzyl alcohol, M.P. 137–139° C., was prepared from 4-amino-3-chloro-α-cyclohexyl-α-(3′-piperidino-n-propyl)-benzyl alcohol and bromine, analogous to Example 172.

EXAMPLE 178

4-amino-α-cyclohexyl - 3,5 - dibromo-α-(3′-pyrrolidino-n-propyl)-benzyl alcohol, M.P. 186.5–188° C., was prepared from 4-amino-α-cyclohexyl-α-(3′-pyrrolidino-n-propyl)-benzyl alcohol and bromine, analogous to Example 171.

EXAMPLE 179

4 - amino - 3 - bromo-α-cyclohexyl-α-(3′-pyrrolidino-n-propyl)-benzyl alcohol, M.P. 153–155° C., was prepared from 4 - amino-α-cyclohexyl-α-(3′-pyrrolidino-n-propyl)-benzyl alcohol and bromine, analogous to Example 173.

EXAMPLE 180

4 - amino - 3 - chloro-α-cyclohexyl-α-(3′-pyrrolidino-n-propyl)-benzyl alcohol, M.P. 144–146° C., was prepared from 4 - amino-α-cyclohexyl-α-(3′-pyrrolidino-n-propyl)-benzyl alcohol and chlorine, analogous to Example 175.

EXAMPLE 181

4-amino-3-bromo - 5 - chloro-α-cyclohexyl-α-(3′-pyrrolidino-n-propyl)-benzyl alcohol, M.P. 167–169° C., was prepared from 4-amino-3-bromo-α-cyclohexyl-α-(3′-pyrrolidino-n-propyl)-benzyl alcohol and chlorine, analogous to Example 176.

EXAMPLE 182

4-amino-3-bromo - 5 - chloro-α-cyclohexyl-α-(3′-hexamethyleneimino-n-propyl)-benzyl alcohol, M.P. 135–136° C., was prepared from 4-amino-3-chloro-α-cyclohexyl-α-(3′-hexamethyleneimino - n - propyl)-benzyl alcohol and bromine, analogous to Example 172.

EXAMPLE 183

4-amino-α-cyclohexyl - 3,5 - dichloro-α-(3′-hexamethyleneimino-n-propyl) - benzyl alcohol, M.P. 138–139.5° C., was prepared from 4-amino-3-chloro-α-cyclohexyl-α-(3′-hexamethyleneimino - n - propyl)-benzyl alcohol and chlorine, analogous to Example 175.

EXAMPLE 184

4-amino - 3 - bromo-α-(4′-fluoro-phenyl)-α-(3″-piperidino-n-propyl)-benzyl alcohol, M.P. 121–123° C., was prepared from 4-amino-α-(4′-fluoro-phenyl)-α-(3″-piperidino-n-propyl)-benzyl alcohol and bromine, analogous to Example 173.

EXAMPLE 185

4 - amino - 3,5- - dibromo-α-(4′-fluoro-phenyl)-α-(3″-piperidino-n-propyl)-benzyl alcohol, M.P. 124.5–126° C., was prepared from 4-amino-α-(4′-fluoro-phenyl)-α-(3″-piperidino-n-propyl)-benzyl alcohol and bromine, analogous to Example 171.

EXAMPLE 186

4-amino - 3,5 - dibromo - α - (4′-fluoro-phenyl)-α-(3″-pyrrolidino-n-propyl)-benzyl alcohol, M.P. 150–151.5° C., was prepared from 4-amino - 3 - bromo-α-(4′-fluoro-phenyl)-α-(3″-pyrrolidino-n-propyl)-benzyl alcohol and bromine, analogous to Example 172.

EXAMPLE 187

4 - amino - 3,5 - dibromo-α-(4′-fluoro-phenyl)-α-(3″-hexamethyleneimino - n - propyl) - benzyl alcohol, M.P. 127.5–129° C., was prepared from 4-amino-α-(4′-fluoro-phenyl)-α-(3″-hexamethyleneimino - n - propyl) - benzyl alcohol, analogous to Exampl 171.

EXAMPLE 188

4-amino-α-cyclohexyl-α-(3′-diethylamino-n-propyl)-3,5-dichloro-benzyl alcohol, M.P. 85–86° C., was prepared from 4-amino-3-chloro-α-cyclohexyl-α-(3′-diethylamino-n-propyl)-benzyl alcohol, analogous to Example 175.

EXAMPLE 189

4 - amino - α - (3′-ethylamino-n-propyl)α-cyclohexyl-3,5-dibromo-benzyl alcohol, M.P. 131–133° C., was prepared from 4-amino-α-(3′-ethylamino-n-propyl)-α-cyclohexyl-benzyl alcohol and bromine, analogous to Example 171.

EXAMPLE 190

4 - amino - α - cyclohexyl-3,5-dibromo-α-[3′-(4″-hydroxy-piperidino)-n-propyl]-benzyl alcohol, M.P. 161.5–163° C., was prepared from 4-amino-3-bromo-α-cyclohexyl - α - [3′-(4″-hydroxy-piperidino)-n-propyl]-benzyl alcohol and bromine, analogous to Example 172.

EXAMPLE 191

4 - amino - 3 - bromo-α-cycloheptyl-α-(3′-pyrrolidino-n-propyl)-benzyl alcohol, M.P. 145–147° C., was prepared from 4 - amino - α-cycloheptyl-α-(3′-pyrrolidino-n-propyl)-benzyl alcohol and bromine, analogous to Example 173.

EXAMPLE 192

4 - amino - 3 - bromo-α-cyclohexyl-α-[3′-(4″-methyl-piperidino)-n-propyl]-benzyl alcohol, M.P. 153–155° C., was prepared from 4-amino-α-cyclohexyl-α-[3′-(4″-methyl-piperidino-n-propyl]-benzyl alcohol and bromine, analogous to Example 173.

EXAMPLE 193

4 - amino - 3 - bromo-α-phenyl-α-(3′-pyrrolidino-n-propyl)-benzyl alcohol, M.P. 109–111° C., was prepared from 4 - amino - α - phenyl-α-(3'-pyrrolidino-n-propyl)-benzyl alcohol and bromine, analogous to Example 173.

EXAMPLE 194

4 - amino - 3-bromo - α-cyclopentyl-α-(3'-pyrrolidino-n-propyl)-benzyl alcohol, M.P. 136–137° C., was prepared from 4 - amino - α - cyclopentyl-α-(3'-pyrrolidino-n-propyl)-benzyl alcohol, analogous to Example 173.

EXAMPLE 195

4 - amino - 3 - chloro-α-cyclohexyl-α-(3'-piperidino-n-propyl)-benzyl alcohol, M.P. 123–126° C., was prepared from 4 - amino - α - cyclohexyl-α-(3'-piperidino-n-propyl)-benzyl alcohol and chlorine, analogous to Example 174.

EXAMPLE 196

4 - amino - α - cyclohexyl - 3,5-dibromo-α-(3'-piperidino-n-propyl)-benzyl alcohol by Method D.—A mixture of 1 gm. of 4-acetamino-α-cyclohexyl-3,5-dibromo-α-(3'-piperidino-n-propyl)-benzyl alcohol, 50 ml. of methanol and 25 ml. of 10 N sodium hydroxide was refluxed for 20 hours. After cooling to room temperature, the mixture was diluted with water, dried with sodium sulfate and the solvent was removed in vacuo. The residue was recrystallized from ethanol, yielding the same compound as in Example 2, M.P. 121–124° C.

Melting point of its hydrochloride: 139–141° C. (decomp.).

Melting point of its p-toluenesulfonate: 127.5–129.5° C.

EXAMPLE 197

4 - amino - 3 - bromo-α-cyclohexyl-α-(3'-piperidino-n-propyl)-benzyl alcohol.—A mixture of 6.2 gm. of 4-acetamino - 3-bromo-α-cyclohexyl-α-(3'-piperidino-n-propyl)-benzyl alcohol, 260 ml. of methanol and 130 ml. of 10 N sodium hydroxide was refluxed for four hours. After cooling to room temperature, the mixture was diluted with water, and the precipitated product was filtered off and recrystallized from ethanol, yielding the same compound as in Example 173, M.P. 137–139° C.

EXAMPLE 198

4 - amino - 3 - chloro-α-cyclohexyl-α-(3'-piperidino-n-propyl)-benzyl alcohol, M.P. 123–126° C., was prepared from 4-acetamino-3-chloro-α-cyclohexyl-α-(3'-piperidino-n-propyl)-benzyl alcohol, analogous to Example 197.

EXAMPLE 199

4 - amino-α-cyclohexyl-3,5-dichloro-α-(3'-piperidino-n-propyl)-benzyl alcohol, M.P. 143–145° C., was prepared from 4 - acetamino-α-cyclohexyl-3,5-dichloro-α-(3'-piperidino-n-propyl)-benzyl alcohol, analogous to Example 196.

EXAMPLE 200

4 - amino - 3 - bromo - 5-chloro-α-cyclohexyl-α-(3'-piperidino-n-propyl)-benzyl alcohol, M.P. 127–139° C., was prepared from 4-acetamino-3-bromo-5-chloro-α-cyclohexyl - α - (3'-piperidino-n-propyl)-benzyl alcohol, analogous to Example 196.

M.P. of its hydrochloride: 139–141° C.

EXAMPLE 201

4 - amino - α - cyclohexyl-3,5-dibromo-α-(3'-pyrrolidino-n-propyl)-benzyl alcohol, M.P. 186.5–188° C., was prepared from 4-acetamino-α-cyclohexyl-3,5-dibromo-α-(3' pyrrolidino - n - propyl)benzyl alcohol, analogous to Example 196.

EXAMPLE 202

4 - amino 3 - bromo - α-cyclohexyl-α-(3'-pyrrolidino-n-propyl)-benzyl alcohol, M.P. 153–155° C., was prepared from 4-acetamino-3-bromo-α-cyclohexyl-α-(3'-pyrrolidino-n-propyl)-benzyl alcohol, analogous to Example 197.

EXAMPLE 203

4 - amino - 3 - chloro-α-cyclohexyl-α-(3'-pyrrolidino-n-propyl)-benzyl alcohol, M.P. 144–146° C., was prepared from 4-acetamino-3-chloro-α-cyclohexyl-α-(3'-pyrrolidino-n-propyl)-benzyl alcohol, analogous to Example 197.

EXAMPLE 204

4 - amino - 3 - bromo-5-chloro-α-cyclohexyl-α-(3'-pyrrolidino-n-propyl)-benzyl alcohol, M.P. 167–169° C., was prepared from 4 - acetamino - 3-bromo-5-chloro-α-cyclohexyl - α-(3'-pyrrolidino-n-propyl)-benzyl alcohol, analogous to Example 196.

EXAMPLE 205

4 - amino - 3 - bromo-5-chloro-α-cyclohexyl-α-(3'-hexamethyleneimino-n-propyl)-benzyl alcohol, M.P. 135–136° C., was prepared from 4-acetamino-3-bromo-5-chloro-α-cyclohexyl - α - (3'-hexamethyleneimino-n-propyl)-benzyl alcohol, analogous to Example 196.

EXAMPLE 206

4 - amino - α - cyclohexyl-3,5-dichloro-α-(3'-hexamethyleneimino-n-propyl)-benzyl alcohol, M.P. 138–139.5° C., was prepared from 4-acetamino-α-cyclohexyl-3,5-dichloro-α-(3'-hexamethyleneimino-n-propyl)-benzyl alcohol, analogous to Example 196.

EXAMPLE 207

4-amino-3-bromo-α - (4'-fluoro-phenyl)-α-(3''-piperidino-n-propyl)benzyl alcohol, M.P. 121–123° C., was prepared from 4-acetamino-3-bromo-α-(4'-fluorophenyl)-α-(3''-piperidino-n-propyl)-benzyl alcohol, analogous to Example 197.

EXAMPLE 208

4-amino-3,5-dibromo - α - (4'-fluoro-phenyl)-α-(3''-piperidino-n-propyl)-benzyl alcohol, M.P. 124.5–126° C., was prepared from 4-acetamino-3,5-dibormo-α-(4'-fluorophenyl)-α-(3'' - piperidino-n-propyl) - benzyl alcohol, analogous to Example 196.

EXAMPLE 209

4-amino-3,5-dibromo-α-(4' - fluoro - phenyl)-α-(3''-pyrrolidino-n-propyl)-benzyl alcohol, M.P. 150–151.5° C., was prepared from 4-acetamino-3,5-dibromo-α-(4'-fluoro-phenyl)-α-(3''-pyrrolidino-n-propyl)-benzyl alcohol, analogous to Example 196.

EXAMPLE 210

4-amino-3,5-dibromo - α - (4'-fluoro-phenyl)-α-(3''-hexamethyleneimino - n-propyl)-benzyl alcohol, M.P. 127.5–129° C., was prepared from 4-acetamino-3,5-dibromo-α-(4'-fluoro-phenyl) - α-(3''-hexamethyleneimino-n-propyl)-benzyl alcohol, analogous to Example 196.

EXAMPLE 211

4-amino-α-cyclohexyl - α - (3'-diethylamino-n-propyl)-3,5-dichloro-benzyl alcohol, M.P. 85–86° C., was prepared from 4-acetamino-α-cyclohexyl-α-(3'-diethylamino-n-propyl)-3,5 - dichloro-benzyl alcohol, analogous to Example 196.

EXAMPLE 212

4-amino-α-(3'-ethylamino - n - propyl)-α-cyclohexyl-3,5-dibromo-benzyl alcohol, M.P. 131–133° C., was prepared from 4-acetamino-α-(3'-ethylamino-n-propyl)-α-cyclohexyl-3,5-dibromo- benzyl alcohol, analogous to Example 196.

EXAMPLE 213

4-amino-α-cyclohexyl - 3,5 - dibromo-α-[3' - (4''-hydroxy-piperidino)-n-propyl]-benzyl alcohol, M.P. 161.5–163° C., was prepared from 4-acetamino-α-cyclohexyl-3,5-dibromo-α-[3' - (4'' - hydroxy-piperidino)-n-propyl]-benzyl alcohol, analogous to Example 196.

EXAMPLE 214

4-amino-3-bromo - α - cycloheptyl-α-(3'-pyrrolidino-n-propyl)-benzyl alcohol, M.P. 145–147° C., was prepared from 4-acetamino-3-bromo-α-cycloheptyl - α - (3'-pyrrolidino-n-propyl)-benzyl alcohol, analogous to Example 197.

EXAMPLE 215

4-amino-3 - bromo-α-cyclohexyl - α - [3',4''-methyl-piperidino)-n-propyl]-benzyl alcohol, M.P. 153–155° C., was prepared from 4-acetamino-3-bromo-α-cyclohexyl-α-[3'-(4''-methyl-piperidino) - n-propyl]-benzyl alcohol, analogous to Example 197.

EXAMPLE 216

4-amino-3-bromo-α-phenyl - α - (3'-pyrrolidino-n-propyl)-benzyl alcohol, M.P. 109–111° C., was prepared from 4-acetamino-3-bromo-α - phenyl-(3'-pyrrolidino-n-propyl)-benzyl alcohol, analogous to Example 197.

EXAMPLE 217

4-amino-3-bromo - α - cyclopentyl-α-(3'-pyrrolidino-n-propyl)-benzyl alcohol, M.P. 136–137° C., was prepared from 4-acetamino-3-bromo-α-cyclopentyl-α-(3'-pyrrolidino-n-propyl)-benzyl alcohol, analogous to Example 197.

EXAMPLE 218

4-amino-α-cyclohexyl - α - (3'-diethylamino-n-propyl)-3,5-dibromo-benzyl alcohol by Method E.—448 mgm. of 4-amino-α-(3' - ethylamino-n-propyl)-α-cyclohexyl-3,5-dibromo-benzyl alcohol were dissolved in 15 ml. of ethanol, and 156 mgm. of ethyliodide and 212 mgm. of sodium carbonate were added thereto; the mixture was refluxed for four hours, then cooled to room temperature, the precipitate formed thereby was filtered off, and the solvent was removed in vacuo from the filtrate. The residue was chromatographed on 30 gm. of silica gel, using a mixture of benzene and acetone (1:1) as the eluant. The fractions containing the desired product were combined, evaporated to dryness in vacuo, and the residue was recrystallized from isopropanol-water, yielding the compound of the formula

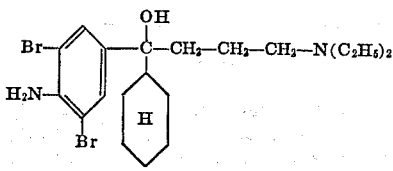

having a melting point of 85–86° C.

EXAMPLE 219

4-amino-α-cyclohexyl - α - (3'-diethylamino-n-propyl)-3,5-dibromo-benzyl alcohol by Method E.—448 mgm. of 4-amino-α-(3'-ethylamino-n-propyl)-α - cyclohexyl-3,5-dibromo-benzyl alcohol were dissolved in 15 ml. of absolute benzene, and 156 mgm. of ethyliodide and 101 mgm. of triethylamine were added. The mixture was refluxed for 12 hours, cooled to room temperature, the precipitate formed thereby was filtered off, and the solvent was removed from the filtrate in vacuo. The residue was chromatographed on 30 gm. of silica gel, using a mixture of benzene and acetone (1:1) as the eluant. The fractions containing the desired product were combined, evaporated in vacuo, and the residue was recrystallized from isopropanol-water, yielding the same compound as in Example 218, M.P. 85–86° C.

EXAMPLE 220

4-amino-α-cyclohexyl - 3,5 - dibromo-α-(3'-di-n-propylamino-n-propyl)-benzyl alcohol.—104 mgm. of lithium wire and 90 mgm. of naphthalene were suspended in 50 ml. of absolute tetrahydrofuran, and the suspension was refluxed for three hours, while stirring. Thereafter, a solution of 4.6 gm. of 4-amino-α-cyclohexyl-3,5-dibromo-α-(3' - n - propylamino-n-propyl)-benzyl alcohol in 15 ml. of absolute tetrahydrofuran and then 12 gm. of n-propyl bromide were added, and the mixture was refluxed for 48 hours. Thereafter, the mixture was cooled to room temperature, diluted with 50 ml. of methanol, and evaporated in vacuo to dryness. The residue was taken up into some benzene, and the undissolved matter was filtered off. The filtrate was chromatographed on 80 gm. of silica gel, using chloroform/ethylacetate (1:1) as the eluant. The fractions containing the desired product were combined, evaporated to dryness, and the residue was crystallized from ethanol/water, yielding the compound of the formula

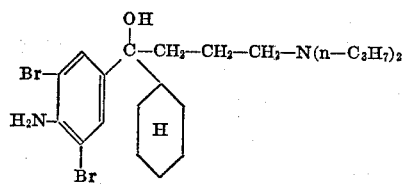

having a melting point of 105–107° C.

EXAMPLE 221

4-amino-α-cyclohexyl-3,5-dibromo-α-(3' - di - n - propylamino-n-propyl)-benzyl alcohol.—4.6 gm. of 4-amino-α-cyclohexyl-3,5-dibromo-α-(3'-n-propylamino - n - propyl)-benzyl alcohol were dissolved in 50 ml. of absolute tetrahydrofuran and, while stirring, 720 mgm. of a suspension of sodium hydride in oil (50%) were added, and the mixture was refluxed for one hour. Then, 12 gm. of n-propyl bromide were added, and the mixture was refluxed for another 12 hours. After cooling to room temperature, the reaction mixture was worked up as described in Example 220, yielding the same product, M.P. 105–107° C.

EXAMPLE 222

4-amino-3,5-dibromo-α-(3'-di-n-propylamino - n - propyl)-α-(4''-fluoro-phenyl)-benzyl alcohol, an oil (proof of structure by NMR-spectrum), was prepared from 4-amino-3,5-dibromo-α-(4'-fluoro-phenyl)-α-(3'' - n - propylamino-n-propyl)-benzyl alcohol and n-propyl bromide, analogous to Examples 220 and 221.

EXAMPLE 223

4-amino-3,5-dibromo-α-(3'-di-n-propylamino - n - propyl)-α-(4''-fluoro-phenyl)-benzyl alcohol, an oil (proof of structure by I.R.-, UV-, NMR-spectra), was prepared from 4-amino-3,5-dibromo-α-(4'-fluoro-phenyl) - α - (3''-n-propylamino - n - propyl)-benzyl alcohol and n-propyl iodide, analogous to Examples 218 and 219.

EXAMPLE 224

4-amino-α-cyclohexyl-3,5-dibromo - α - [3'-(N-methylethylamino)-n-propyl]-benzyl alcohol, M.P. 135–136° C., was prepared from 4-amino-α-(3'-ethylamino-n-propyl)-α-cyclohexyl-3,5-dibromo-benzyl alcohol and methyl iodide, analogous to Examples 218 and 219.

The compounds according to the present invention, that is, those embraced by Formula I above and their nontoxic, pharmacologically acceptable acid addition salts, have useful pharmacodynamic properties. More particularly, the compounds of the present invention exhibit sedative, antiemetic, stomach ulcer inhibiting and/or CNS-stimulating activities in warm-blooded animals, such as mice and dogs.

Especially effective CNS-stimulants are those compounds of the Formula I wherein $R_2$ and $R_3$, together with each other and the nitrogen atom to which they are attached, are N-methyl-piperazino.

Particularly effective sedative and stomach ulcer inhibiting activities are exhibited by those compounds of the Formula I wherein $R_2$ and $R_3$, together with each other and the nitrogen atom to which they are attached, are pyrrolidino, piperidino or hexamethyleneimino, and $R_4$ is substituted or unsubstituted phenyl or cycloalkyl.

The sedative or CNS-stimulating activity of the compounds according to the present invention was ascertained by measurement of the spontaneous motility in mice pursuant to the standard test method of H. Friebel et al., Arzneimittelforschung 9, 126 (1959).

The stomach ulcer inhibiting activity was ascertained by the standard test method of K. Tagaki et al., Jap. J. Pharmac. 18, 9–18 (1968).

The antiemetic activity was determined on dogs by the standard test method of H. L. Borison et al., Pharmacol. Rev. 5, 195 (1953).

For pharmaceutical purposes the compounds according to the present invention are administered to warm-blooded animals perorally or parenterally as sole active ingredients or in combination with other active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.166 to 0.67 mgm./kg., preferably 0.25 to 0.34 mgm./kg. body weight, and the effective daily dose rate is from 0.166 to 2.0 mgm./kg. preferably 0.33 to 1.34 mgm./kg. body weight.

The following examples illustrate a few dosage unit compositions comprising a compound of the present invention as an active ingredient and represent the best modes contemplated of putting the invention into practical use. The parts are parts by weight unless otherwise specified.

EXAMPLE 225

Tablets

The tablet composition was compounded from the following ingredients:

| | Parts |
|---|---|
| 4-amino-α-cyclohexyl-3,5-dibromo - α - (3'-piperidino-n-propyl)-benzyl alcohol | 20.0 |
| Lactose | 60.0 |
| Corn starch | 37.0 |
| Gelatin | 2.0 |
| Magnesium stearate | 1.0 |
| Total | 120.0 |

Preparation

The benzyl alcohol compound was intimately admixed with the lactose and the corn starch, the mixture was moistened with an aqueous 8% solution of the gelatin, the moist mass was granulated by forcing it through a 1.5 mm.-mesh screen, and the granulate was dried at 45° C. and again passed through a 1.0 mm.-mesh screen. The granulate thus obtained was admixed with the magnesium stearate, and the composition was compressed into 120 mgm.-tablets. Each tablet contained 20 mgm. of the benzyl alcohol compound and, when administered perorally to a warm-blooded animal of about 60 kg. body weight in need of such treatment, produced very good sedative, antiemetic, and stomach ulcer inhibiting activities.

EXAMPLE 226

Coated tablets

The tablets obtained in Example 225 were coated with a thin shell consisting essentially of sugar and talcum, and the coating was polished with beeswax, all according to conventional methods. The coated tablets produced the same pharmacodynamic effects as the uncoated tablets of the preceding example.

EXAMPLE 227

Hypodermic solution

The solution was compounded from the following ingredients:

| | Parts |
|---|---|
| 4 - amino-α-cyclohexyl - 3,5 - dichloro-α-(3'-piperidino-n-propyl)-benzyl alcohol hydrochloride | 15.0 |
| Sorbitol | 130.0 |
| Distilled water | ¹Q.s. ad 3000.0 |

¹ By volume.

Preparation

The benzyl alcohol compound and the sorbitol were dissolved in a sufficient amount of distilled water, the solution was diluted with additional distilled water to the indicated volume, the resulting solution was filtered through a membrane filter until free from suspended matter, and the filtrate was filled into clear, colorless 3 ml. ampules which were then sealed and sterilized at 120° C. for 20 minutes. Each ampule contained 15 mgm. of the benzyl alcohol compound, and when the contents thereof were administered intramuscularly to a warm-blooded animal of about 60 kg. body weight in need of such treatment, very good sedative, antiemetic, and stomach ulcer inhibiting effects were obtained.

EXAMPLE 228

Rectal suppositories

The suppository composition was compounded from the following ingredients:

| | Parts |
|---|---|
| 4-amino - 3 - bromo - 5 - chloro-α-cyclohexyl-α-(3'-piperidino-n-propyl)-benzyl alcohol | 30.0 |
| Cocoa butter | 1,670.0 |
| Total | 1,700.0 |

Preparation

The cocoa butter was melted and cooled to 40° C., the milled benzyl alcohol compound was homogeneously stirred into the cocoa butter with an immersion homogenizer, and 1700 mgm.-portions of the composition were poured at 37° C. into cooled suppository molds. Each suppository contained 30 mgm. of the benzyl alcohol compound and, when administered by the rectal route to a warm-blooded animal of about 60 kg. body weight in need of such treatment, produced very good sedative, antiemetic and stomach ulcer inhibiting effects.

EXAMPLE 229

Suspension

The suspension was compounded from the following ingredients:

| | Parts |
|---|---|
| 4-amino - α - cyclohexyl - 3,5 - dibromo-α-(3'-piperidino-n-propyl)-benzyl alcohol | 0.4 |
| Dioctyl sodium sulfosuccinate (DONSS) | 0.02 |
| Benzoic acid | 0.1 |
| Sodium cyclamate | 0.2 |
| Colloidal magnesium aluminum silicate | 1.0 |
| Polyvinylpyrrolidone | 0.1 |
| Sorbitol | 25.0 |
| Raspberry flavoring | 0.1 |
| Distilled water | 88.08 |
| Total | 115.00 |

Preparation

The DONSS and the finely milled benzyl alcohol compound were successively dissolved and suspended, respectively, in about 15% of the indicated amount of distilled water. The balance of the distilled water was heated to 80° C., the magnesium aluminum silicate was suspended therein, and then the benzoic acid, the sodium cyclamate, the sorbitol and the polyvinyl pyrrolidone were dissolved in the hot aqueous suspension. The hot solution was cooled to room temperature, and then the suspension containing the active ingredient was added thereto, the flavoring was added, and the finished mixture was homogenized. 5 ml. of the homogeneous suspension thus obtained contained 20 mgm. of the benzyl alcohol compound, and when that amount was administered perorally to a warm-blooded animal of about 60 kg. body weight in need of such treatment, very good sedative, antiemetic, and stomach ulcer inhibiting effects were obtained.

EXAMPLE 230

Gelatin capsules

The capsule filler composition was compounded from the following ingredients:

| | Parts |
|---|---|
| 4-amino-α-cyclohexyl - 3,5 - dichloro-α-(3'-piperidino-n-propyl)-benzyl alcohol | 20.0 |
| Corn starch, dry | 159.0 |
| Magnesium stearate | 1.0 |
| Total | 180.0 |

Preparation

The ingredients were intimately admixed with each other, and 180 mgm.-portions of the mixture were filled into size 4 gelatin capsules. Each capsule contained 20 mgm. of the benzyl alcohol compound and, when administered perorally to a warm-blooded animal of about 60 kg. body weight in need of such treatment, produced very good sedative, antiemetic and stomach ulcer inhibiting effects.

EXAMPLE 231

Drop solution

The solution was compounded from the following ingredients:

| | Parts |
|---|---|
| 4 - amino - 3 - bromo-5-chloro-α-cyclohexyl-α-(3'-piperidino-n-propyl)-benzyl alcohol tartrate | 2.0 |
| Methyl p-hydroxy-benzoate | 0.1 |
| Sodium cyclamate | 0.2 |
| Glycerin | 20.0 |
| Juniper berry flavoring | 1.0 |
| Distilled water | [1] Q.s. ad 100.0 |

[1] By volume.

Preparation

A sufficient amount of distilled water was heated to 70° C., and the benzoate, the cyclamate, the benzyl alcohol compound and the glycerin were successively dissolved therein. The resulting solution was cooled to room temperature, the flavoring was added thereto, and the solution was diluted with more distilled water to the indicated volume. 1 ml. of the finished solution (about 20 drops) contained 20 mgm. of the benzyl alcohol compound and, when administered perorally to a warm-blooded animal of about 60 kg. body weight in need of such treatment, produced very good sedative, antiemetic, and stomach ulcer inhibiting effects.

EXAMPLE 232

Tablets with combination of active ingredients

The tablet composition was compounded from the following ingredients:

| | Parts |
|---|---|
| 4-amino-α-cyclohexyl - 3,5 - dibromo-α-(3'-piperidino-n-propyl)-benzyl alcohol | 20.0 |
| Phenyl ethyl barbituric acid | 20.0 |
| Lactose | 120.0 |
| Corn starch | 54.0 |
| Gelatin | 4.0 |
| Magnesium stearate | 2.0 |
| Parts | 220.0 |

Preparation

The tablet composition was compounded in a manner analogous to that described in Example 225, and the composition was compressed into 220 mgm.-tablets. Each tablet contained 20 mgm. of the benzyl alcohol compound and 20 mgm. of the barbituric acid compound and, when administered perorally to a warm-blooded animal of about 60 kg. body weight in need of such treatment, produced very good sedative, antiemetic and stomach ulcer inhibiting effects.

Analogous results were obtained when any one of the other benzyl alcohol compounds embraced by Formula I, or a non-toxic acid addition salt thereof, having the same activity was substituted for the particular benzyl alcohol compound in Examples 225 through 232. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

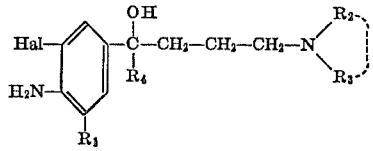

wherein

Hal is chlorine or bromine, $R_1$ is hydrogen, chlorine or bromine, $R_2$ is hydrogen, lower alkyl or allyl, $R_3$ is lower alkyl, allyl, phenyl, benzyl, cyclohexyl or diethylaminoethyl, $R_2$ and $R_3$, together with each other and the nitrogen atom to which they are attached, are pyrrolidino, morpholino, N-methyl-piperazino, camphidino, hexamethyleneimino, piperidino, hydroxy-piperidino, methyl-piperidino, ethyl-piperidino, dimethyl-piperidino or methoxy-piperidino, and $R_4$ is cyclopropyl, cyclopentyl, cyclohexyl, methyl-cyclohexyl, dimethyl-cyclohexyl, cycloheptyl, or cyclohexylmethyl, or a non-toxic, pharmacologically acceptable acid addition salt thereof.

2. A compound according to claim 1, which is 4-amino-3-bromo-5-chloro - α - cyclohexyl-α-(3'-piperidino-n-propyl)-benzyl alcohol or a non-toxic, pharmacologically acceptable acid addition salt thereof.

3. A compound according to claim 1, which is 4-amino-α-cyclohexyl-3,5-dichloro - α - (3' - piperidino-n-propyl)- benzyl alcohol, or a non-toxic, pharmacologically acceptable acid addition salt thereof.

4. A compound according to claim 1, which is 4-amino-α-cyclohexyl - 3,5 - dichloro-α-(3'-hexamethyleneimino-n-propyl)-benzyl alcohol, or a non-toxic, pharmacologically acceptable acid addition salt thereof.

5. A compound according to claim 1, which is 4-amino-α-cyclohexyl - 3,5 - dibromo-α-(3'-pyrrolidino-n-propyl)-benzyl alcohol or a non-toxic, pharmacologically acceptable acid addition salt thereof.

6. A compound according to claim 1, which is 4-amino-α-cyclohexyl-3,5-dibromo-α-(3' - piperidino - n - propyl)-benzyl alcohol or a non-toxic, pharmacologically acceptable acid addition salt thereof.

7. A compound according to claim 1, which is 4-amino-3-bromo-α-cyclohexyl - α - (3'-pyrrolidino-n-propyl)-benzyl alcohol or a non-toxic, pharmacologically acceptable acid addition salt thereof.

8. A compound according to claim 1, which is 4-amino-3-bromo-α-cycloheptyl-α-(3' - pyrrolidino-n-propyl)-benzyl alcohol or a non-toxic, pharmacologically acceptable acid addition salt thereof.

9. A compound according to claim 1, which is 4-amino-3-bromo-α-cyclohexyl-α-[3'-(4" - methyl - piperidino)-n-propyl]-benzyl alcohol or a non-toxic, pharmacologically acceptable acid addition salt thereof.

References Cited

UNITED STATES PATENTS

| | | | |
|---|---|---|---|
| 3,536,712 | 10/1970 | Keck et al. | 260—239 B |
| 3,574,211 | 4/1971 | Keck et al. | 260—239 B |
| 3,128,278 | 4/1964 | Craig et al. | 260—293.84 |
| 3,553,225 | 1/1971 | Kaiser et al. | 260—570.6 |

FOREIGN PATENTS

| | | | |
|---|---|---|---|
| 956,615 | 4/1964 | Great Britain | 260—293.84 |

ALTON D. ROLLINS, Primary Examiner

U.S. Cl. X.R.

260—247.5 R, 268 R, 268 BC, 268 BF, 293.54, 293.62, 293.79, 296 R, 326.5 L, 326.5 S, 326.5 SM, 326.5 C, 570 AB, 570.6; 424—244, 248, 263, 267, 274, 275, 330

UNITED STATES PATENT OFFICE
CERTIFICATE OF CORRECTION

Patent No. 3,794,645        Dated February 26, 1974

Inventor(s) Helmut Pieper et al.

It is certified that error appears in the above-identified patent and that said Letters Patent are hereby corrected as shown below:

Column 4, line 54, "actamido" should read -- acetamido --.

Column 5, line 10, the formula should appear as shown below:

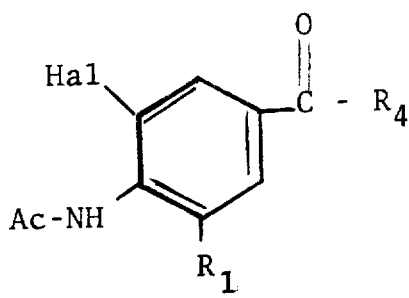

Column 6, line 16, "212-124°C" should read -- 121-124°C --.

Column 8, line 27, "UV-4'" should read -- -4' --.

Column 16, line 68, "amido" should read -- amino --.

Column 19, line 63, "spectral" should read -- spectra --.

Signed and sealed this 1st day of October 1974.

(SEAL)
Attest:

McCOY M. GIBSON JR.
Attesting Officer

C. MARSHALL DANN
Commissioner of Patents